United States Patent
Schaedler et al.

(10) Patent No.: US 7,044,260 B2
(45) Date of Patent: May 16, 2006

(54) VACUUM ACTUATED DIRECTION AND SPEED CONTROL MECHANISM

(75) Inventors: Axel Schaedler, Olmsted Falls, OH (US); Scott Bly, Parma, OH (US)

(73) Assignee: MTD Products Inc., Valley City, OH (US)

( * ) Notice: Subject to any disclaimer, the term of this patent is extended or adjusted under 35 U.S.C. 154(b) by 233 days.

(21) Appl. No.: 10/618,002

(22) Filed: Jul. 11, 2003

(65) Prior Publication Data
US 2004/0053742 A1    Mar. 18, 2004

Related U.S. Application Data

(60) Provisional application No. 60/395,207, filed on Jul. 11, 2002.

(51) Int. Cl.
*B60K 17/00* (2006.01)
(52) U.S. Cl. .................. 180/336; 74/473.11; 701/51
(58) Field of Classification Search ............ 180/336, 180/338, 366; 477/48, 46, 78, 79; 74/335, 74/473.11, 473.12, 473.3; 701/51, 60
See application file for complete search history.

(56) References Cited

U.S. PATENT DOCUMENTS

| | | | |
|---|---|---|---|
| 2,245,714 A | 6/1941 | Price et al. | |
| 2,287,179 A | 6/1942 | Kocher | |
| 2,323,519 A | 7/1943 | Dean | |
| 2,906,292 A | 9/1959 | Mayo | |
| 3,367,459 A | 2/1968 | Rubin | |
| 3,440,740 A | 4/1969 | Kamlukin | |
| 3,528,231 A | 9/1970 | Keller et al. | |
| 3,543,892 A | 12/1970 | De Baillie | |
| 3,656,595 A | 4/1972 | Gethmann et al. | |
| 3,901,342 A | 8/1975 | Nunn, Jr. | |
| 3,908,345 A | 9/1975 | Oni et al. | |
| 4,006,580 A | 2/1977 | Kalleicher | |
| 4,282,465 A | 8/1981 | Acker et al. | |
| 4,285,169 A | 8/1981 | Franklin | |
| 4,295,327 A | 10/1981 | Bortolussi | |
| 4,300,652 A | 11/1981 | Redzinski et al. | |
| 4,338,832 A * | 7/1982 | Pelligrino | 477/63 |
| 4,364,301 A | 12/1982 | Kawabata et al. | |
| 4,388,856 A | 6/1983 | Cook | |
| 4,395,865 A | 8/1983 | Davis, Jr. et al. | |
| 4,437,386 A | 3/1984 | Baumgartner | |
| 4,499,793 A * | 2/1985 | Jow et al. | 477/78 |
| 4,515,040 A * | 5/1985 | Takeuchi et al. | 477/48 |
| 4,515,066 A | 5/1985 | Ito et al. | |

(Continued)

FOREIGN PATENT DOCUMENTS

GB        417648      10/1934

(Continued)

*Primary Examiner*—Eric Culbreth
(74) *Attorney, Agent, or Firm*—Wegman, Hessler & Vanderburg

(57) ABSTRACT

An electronic control system for shifting the direction in an off road vehicle such as a lawn and garden tractor or a utility vehicle is disclosed. The control system consists of a control mechanism that activates a control circuit that in turn activates an actuator to shift the transmission. The control mechanism receives inputs from the operator and sends the appropriate output to the control circuit which thereby actuates the actuator. The control system further includes a sensor that senses neutral or not neutral. The sensor additionally supplies a neutral or not neutral input to the control mechanism. The combination of the input from the operator and the sensor indicates the direction of the vehicle.

7 Claims, 26 Drawing Sheets

U.S. PATENT DOCUMENTS

| | | | |
|---|---|---|---|
| 4,531,348 A | 7/1985 | De Vilder et al. | |
| 4,580,669 A | 4/1986 | Marto | |
| 4,601,369 A * | 7/1986 | Hattori et al. | 74/473.12 |
| 4,622,859 A | 11/1986 | Hobson | |
| 4,669,361 A | 6/1987 | Ito et al. | |
| 4,734,861 A | 3/1988 | Bertolasi et al. | |
| 4,756,234 A | 7/1988 | Anderson | |
| 4,799,418 A | 1/1989 | Takahashi et al. | |
| 4,831,915 A | 5/1989 | Roach | |
| 4,835,949 A | 6/1989 | Seyerle | |
| 4,928,458 A | 5/1990 | Muroya | |
| 5,022,509 A * | 6/1991 | Schweiger | 477/79 |
| 5,035,158 A * | 7/1991 | Leigh-Monstevens | 477/36 |
| 5,138,825 A | 8/1992 | Trefz et al. | |
| 5,239,242 A | 8/1993 | Pickering et al. | |
| 5,259,175 A | 11/1993 | Schmidt | |
| 5,321,910 A | 6/1994 | Legendre et al. | |
| 5,321,938 A | 6/1994 | LeBlanc | |
| 5,335,487 A | 8/1994 | Murakawa et al. | |
| 5,351,467 A | 10/1994 | Trefz et al. | |
| 5,353,578 A | 10/1994 | Irby et al. | |
| 5,381,648 A | 1/1995 | Seegert et al. | |
| 5,477,642 A | 12/1995 | Legendre | |
| 5,526,633 A | 6/1996 | Strong et al. | |
| 5,528,886 A | 6/1996 | Esau | |
| 5,529,135 A | 6/1996 | Wenzel et al. | |
| 5,568,761 A | 10/1996 | Legendre | |
| 5,636,444 A | 6/1997 | Nickel | |
| 5,651,422 A | 7/1997 | Casali | |
| 5,778,330 A | 7/1998 | McKee | |
| 5,809,441 A | 9/1998 | McKee | |
| 5,943,912 A | 8/1999 | Fowler et al. | |
| 5,959,421 A | 9/1999 | Cherry, Jr. et al. | |
| 6,002,976 A | 12/1999 | Hollstein et al. | |
| 6,151,543 A | 11/2000 | McKee et al. | |
| 6,437,458 B1 | 8/2002 | Baggett | |

FOREIGN PATENT DOCUMENTS

| | | |
|---|---|---|
| GB | 517979 | 2/1940 |
| GB | 527437 | 10/1940 |

* cited by examiner

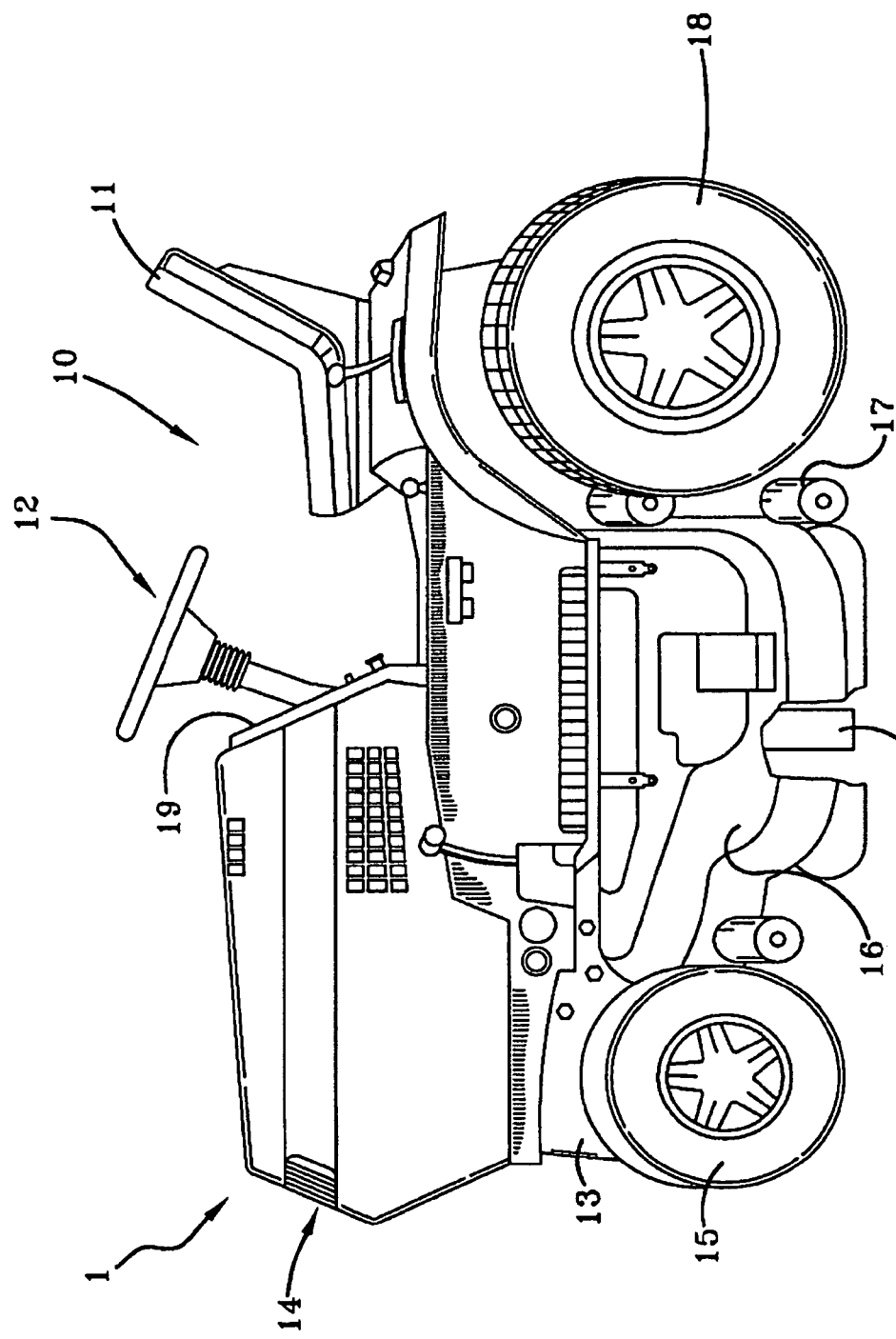

VACUUM ACTUATED DIRECTION AND SPEED CONTROL MECHANISM

This application claims priority from U.S. provisional patent application Ser. No. 60/395,207, entitled VACUUM ACTUATED DIRECTION CONTROL MECHANISM, filed on Jul. 11, 2002.

I. BACKGROUND OF THE INVENTION

A. Field of Invention

The present invention relates to the field of drive systems with direction and speed change mechanisms and more specifically to methods and apparatuses for using an electronically controlled actuator to adjust a vehicle transmission settings and/or vehicle speeds in an off the road vehicle such as a lawn and garden tractor or a utility vehicle.

B. Description of the Related Art

The use of hydrostatic transmissions is now well known in the art of off the road vehicles such as lawn and garden tractors and utility vehicles. A hydrostatic transmission permits the operator to experience the "feel" of an automobile-like automatic transmission while operating an off road vehicle. In particular the operator can shift between forward, reverse and neutral in the same sense that an automatic transmission allows an operator of a car to shift between forward, reverse and neutral. However, one known disadvantage with using a hydrostatic transmission on a vehicle is the cost. A disadvantage with a conventional transmission occurs when the operator is driving the vehicle slowly in the forward direction and releases his foot off the acceleration pedal. If the operator then tries to shift the transmission into reverse the transmission will have a tendency to "bind up," that is, become difficult to shift. The present invention provides for an improvement in the shifting of gears in a conventional transmission as well as an improvement in adjusting speeds in an off road vehicle.

Other objects and advantages of the invention will appear from the following detailed description of the preferred embodiment of the invention with reference being made to the accompanying drawings.

II. SUMMARY OF THE INVENTION

One aspect of the invention is directed to an off the road vehicle. The vehicle includes a frame, an engine operatively supported by the frame, and at least a first ground engaging drive wheel operatively supported by the frame. The vehicle also includes a drive system for use in selectively driving the at least first ground engaging drive wheel, the drive system being operatively connected to the engine, the drive system including a transmission having a forward condition, a reverse condition and a neutral condition for driving the ground engaging wheel, the transmission having an actuator rod attached thereto for use in shifting the transmission between the forward, reverse and neutral conditions. The vehicle also includes a transmission control system. The transmission control system includes an operator actuated activating means and a shift control mechanism that selectively receives an input from the activating means and selectively sends a corresponding output. The transmission control system also includes a vacuum actuator operatively connected to the shift control mechanism and operatively connected to the actuating rod; the vacuum actuator receiving the output from the shift control mechanism and adjusting the actuating rod to shift the transmission between the forward and reverse directions. The vehicle also includes a sensing mechanism, the sensing mechanism comprising a sensor detector and a sensor, the sensor detector being connected to the actuator rod so as to move with the actuator rod when shifting the transmission between the forward, reverse and neutral conditions, wherein the sensor detects when the sensor detector is in a neutral condition and when the sensor detector is not in the neutral condition.

Another aspect of the invention is directed to a direction control system for an off-road vehicle having a drive system that selectively drives at least one ground engaging drive wheel, the drive system including a transmission having a forward condition, a reverse condition and a neutral condition for driving the ground engaging wheel. The control system includes a plurality of push buttons, the push buttons comprising at least a forward, a reverse and a neutral push button. The control system also includes a vacuum actuator and an actuator rod operatively connected to the transmission and to the vacuum actuator. The actuator rod is movable in first and second directions by the vacuum actuator into a forward position, a reverse position, and a neutral position thereby commanding the transmission into the transmission into forward condition, the reverse condition, and the reverse condition, respectively. The control system also includes a shift control mechanism that receives inputs from the plurality of push button and uses the inputs to control the vacuum actuator to selectively move the actuator rod to shift the transmission between the forward, reverse and neutral conditions based on the condition of the plurality of push buttons. The control system also includes a sensing mechanism, the sensing mechanism comprising a sensor detector and a sensor, the sensor detector being connected to the actuator rod so as to move with the actuator rod when shifting the transmission between the forward, reverse and neutral conditions, wherein the sensor detects when the actuator rod is in a neutral position and when the actuator rod is not in the neutral position.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 1 is a side view of a riding lawn tractor that may employ the control mechanism of the present invention.

Figure 14:
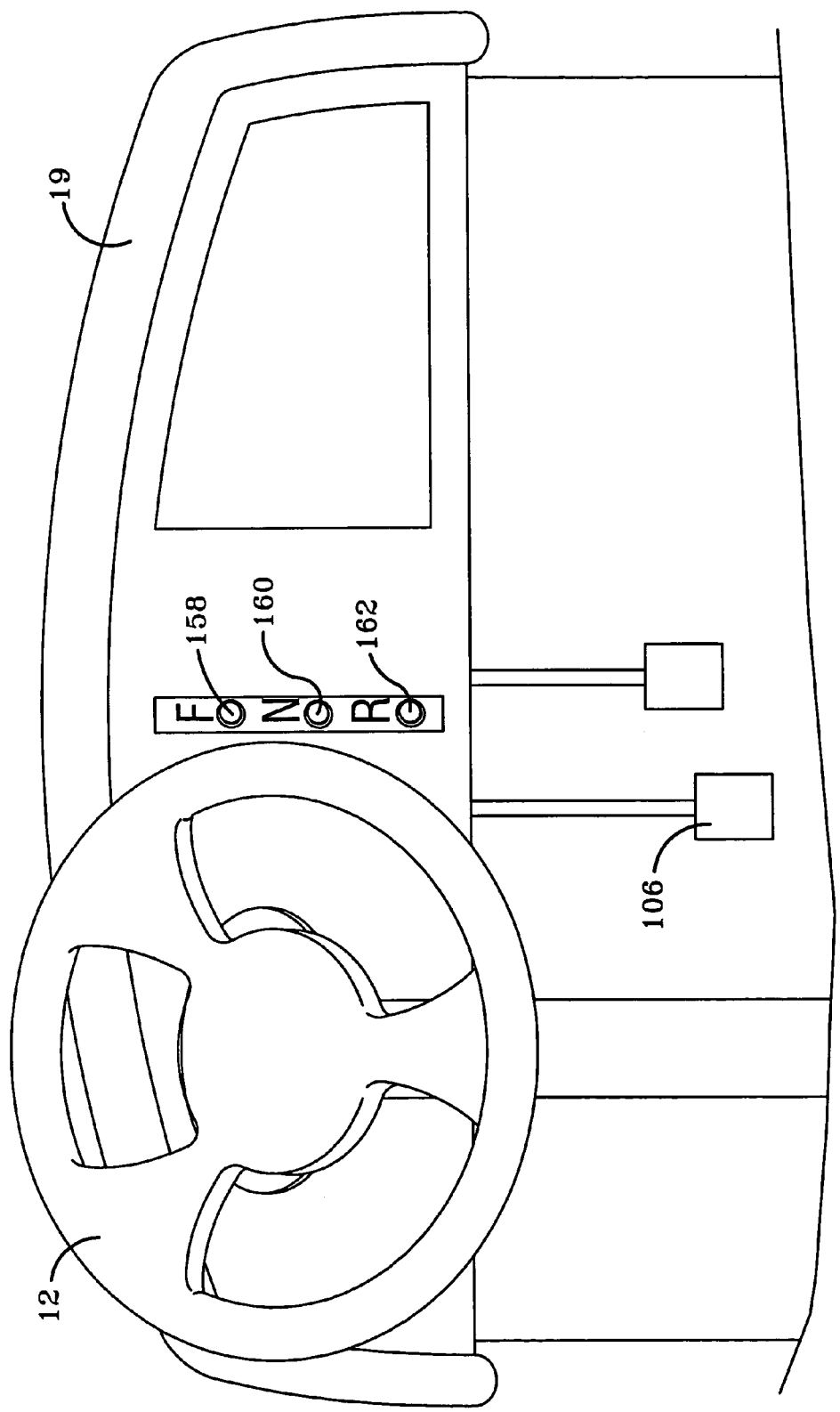
FIG. 14 is a close up view of the utility vehicle shown in FIG. 12 showing the steering wheel and dashboard having pushbuttons.
Figure 16:
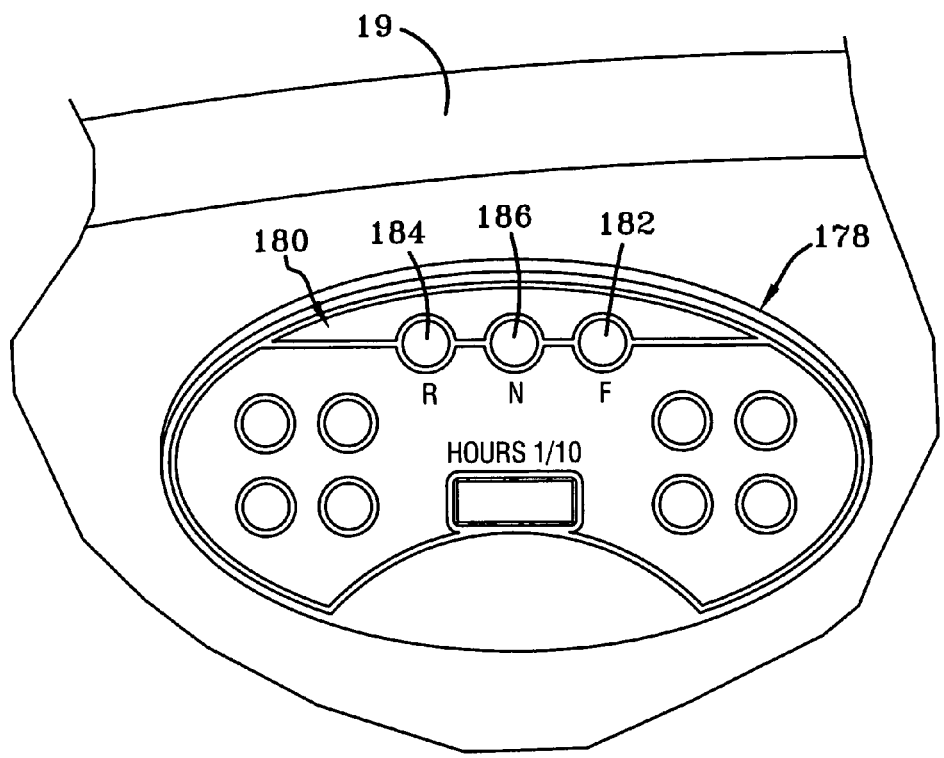

FIG. 16 a close up view of dashboard shown in FIG. 14 showing the location of the forward, neutral and reverse indicating lights.

Figure 13:
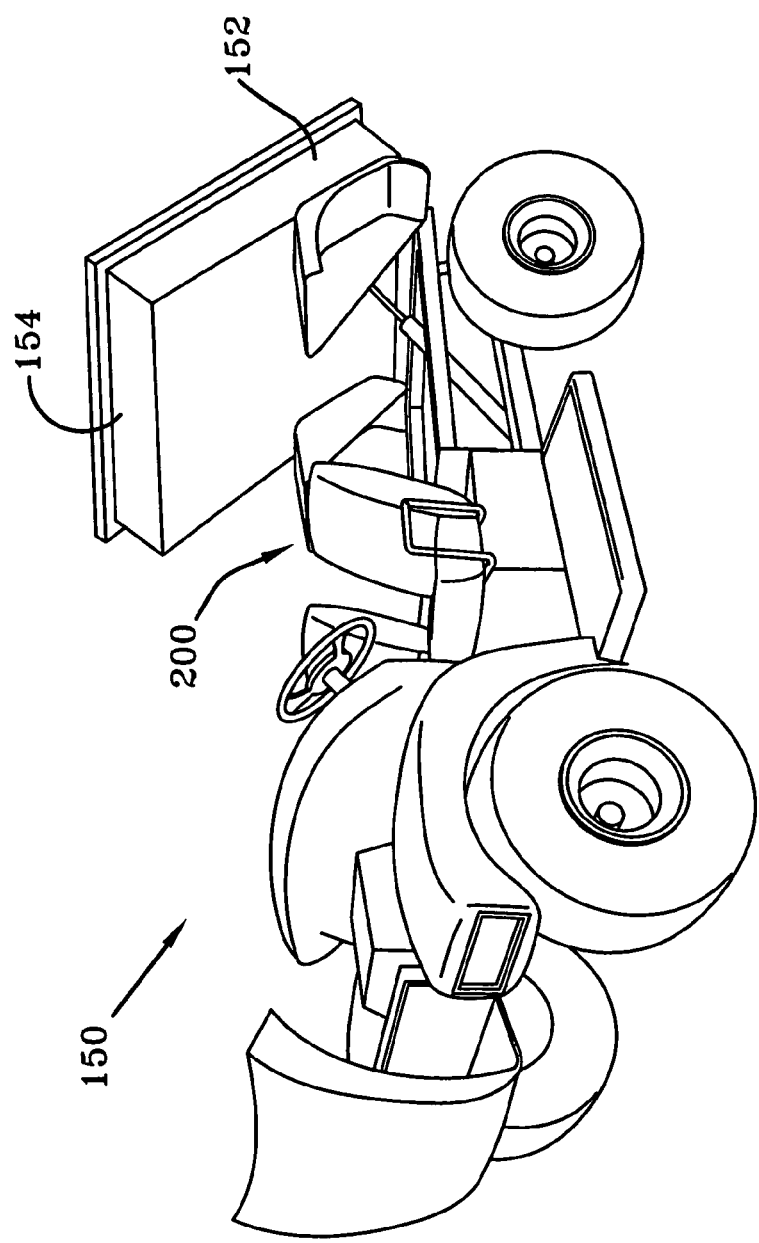
FIG. 13 is an opposite side view of the utility vehicle shown in FIG. 12 showing the loading bed in the raised position and the hood in an open position.
Figure 17:
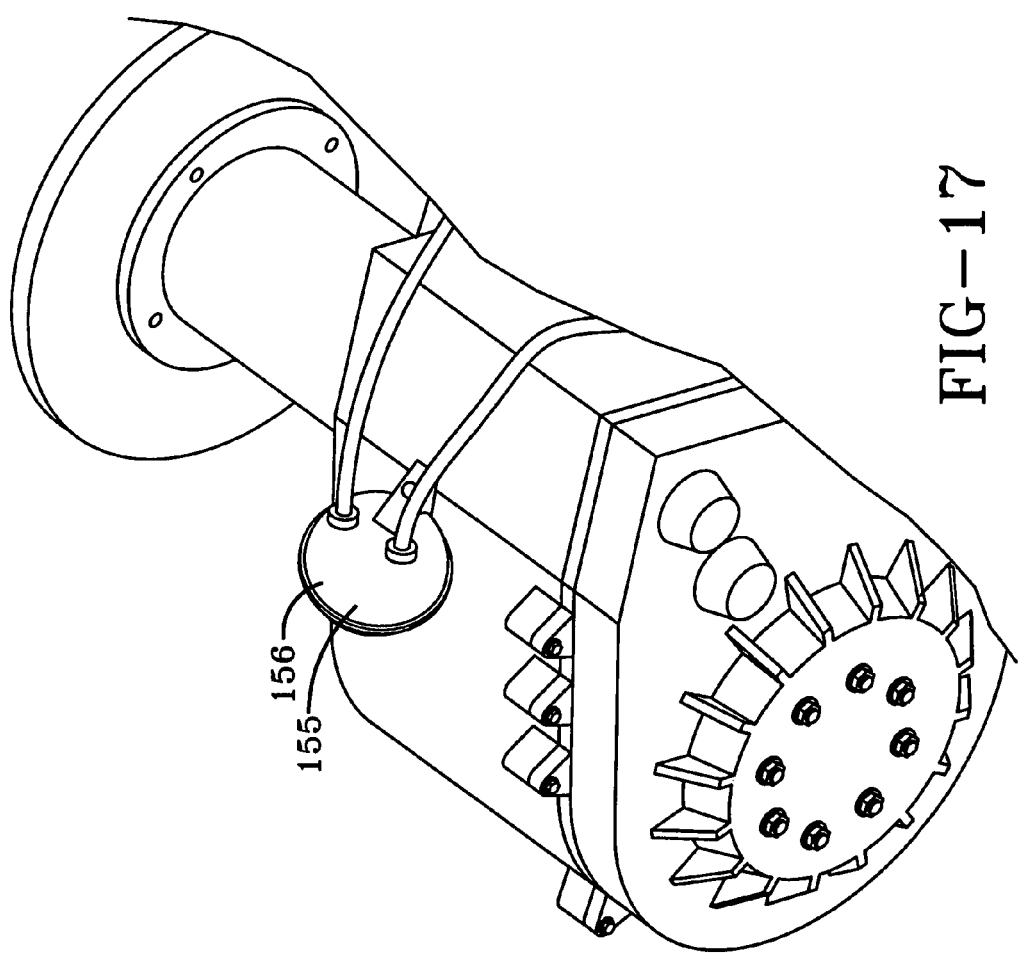

FIG. 17 is a close up view of the drive system of FIG. 13 showing the vacuum accumulator.

Figure 18:
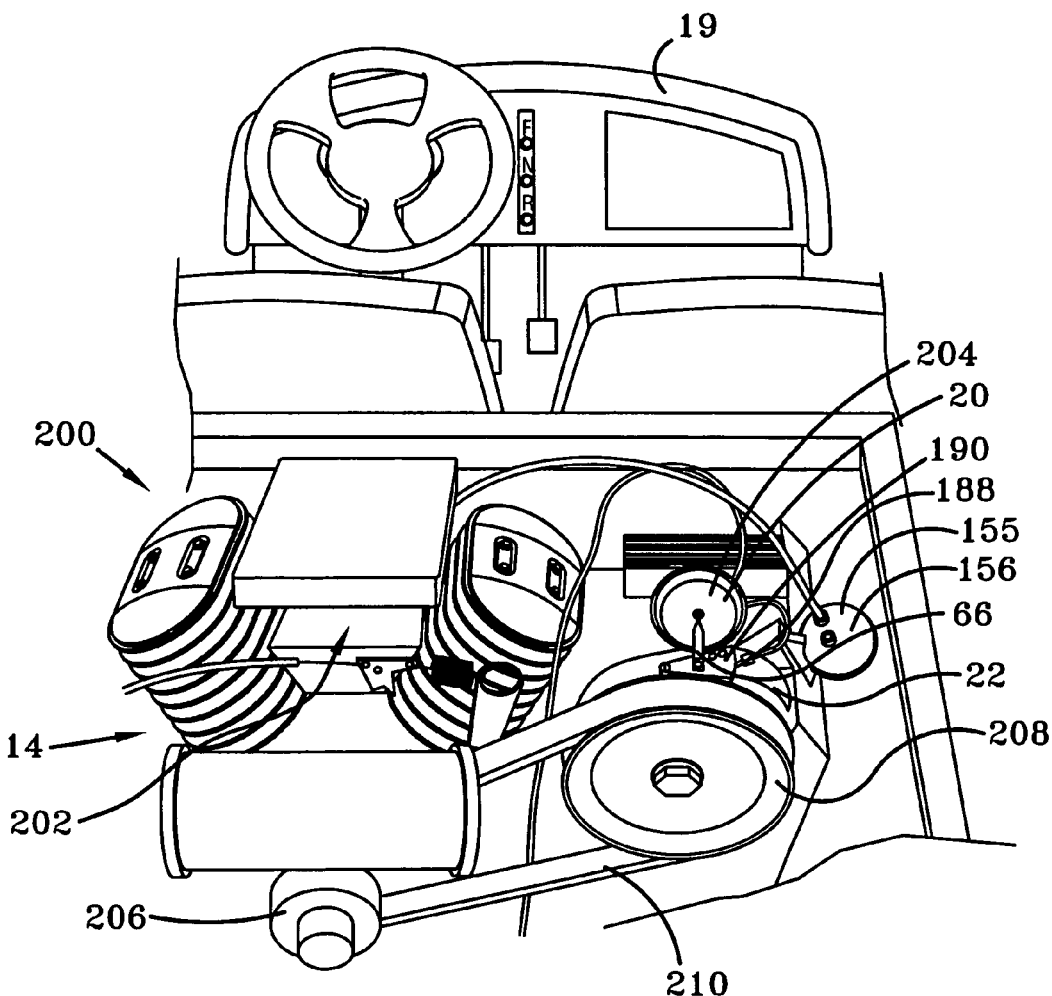

FIG. 18 is a rear view of the drive system of FIG. 13 showing the location of the sensor.

Figure 19:
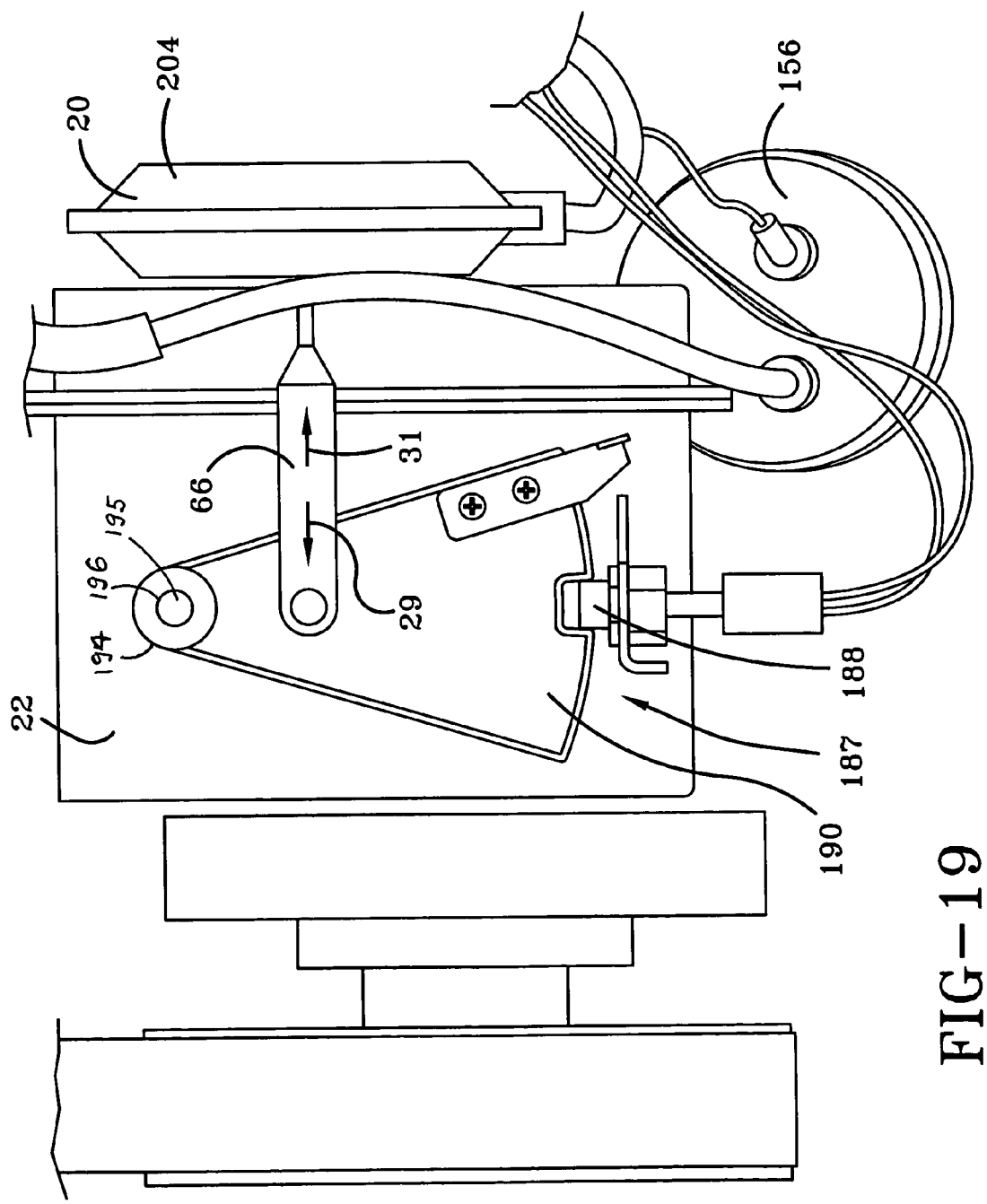

FIG. 19 is a close up view of the sensor and accumulator shown in FIG. 18.

Figure 20:
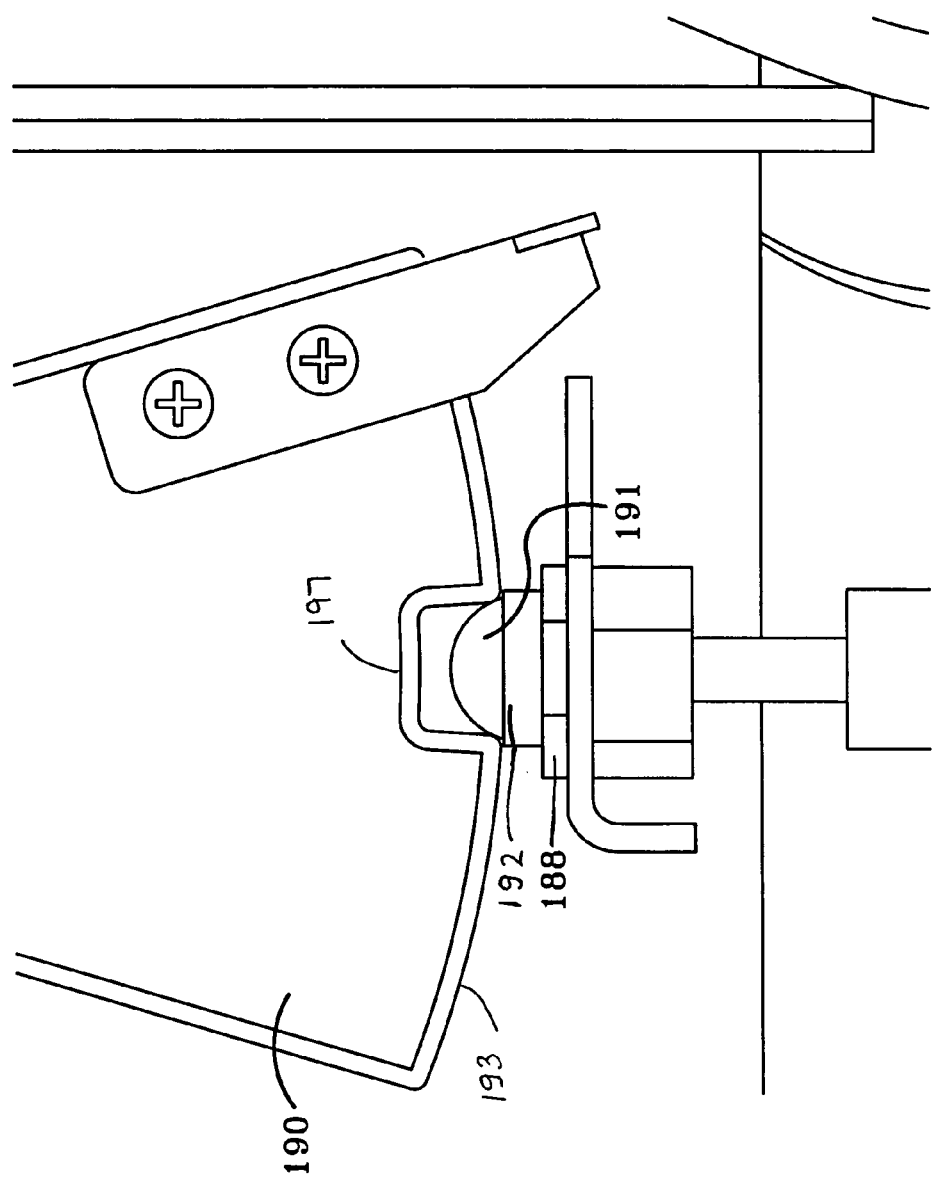

FIG. 20 is a close up view of the sensor in the neutral position.

Figure 21:
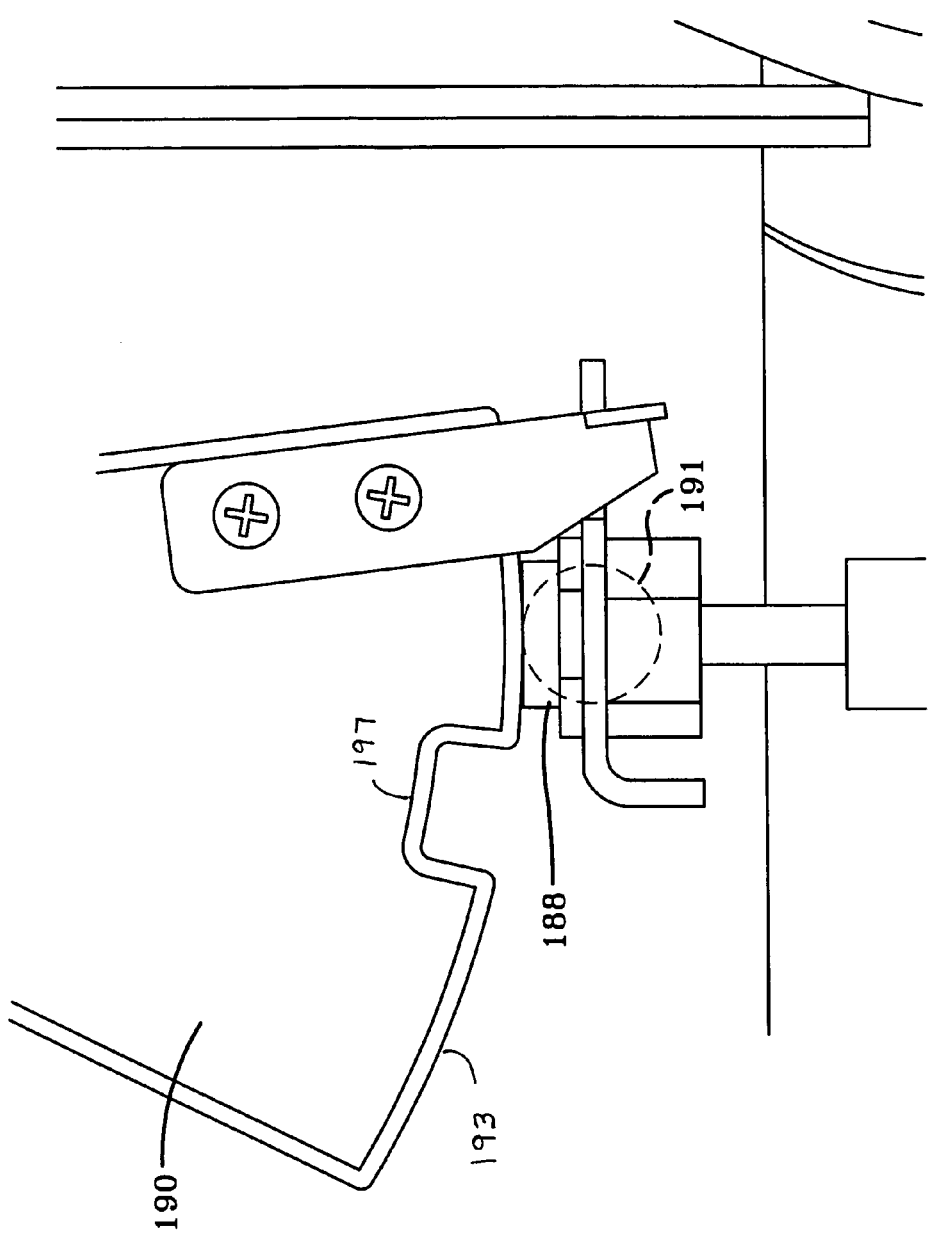

FIG. 21 is a close up view of the sensor in the first position.

Figure 22:
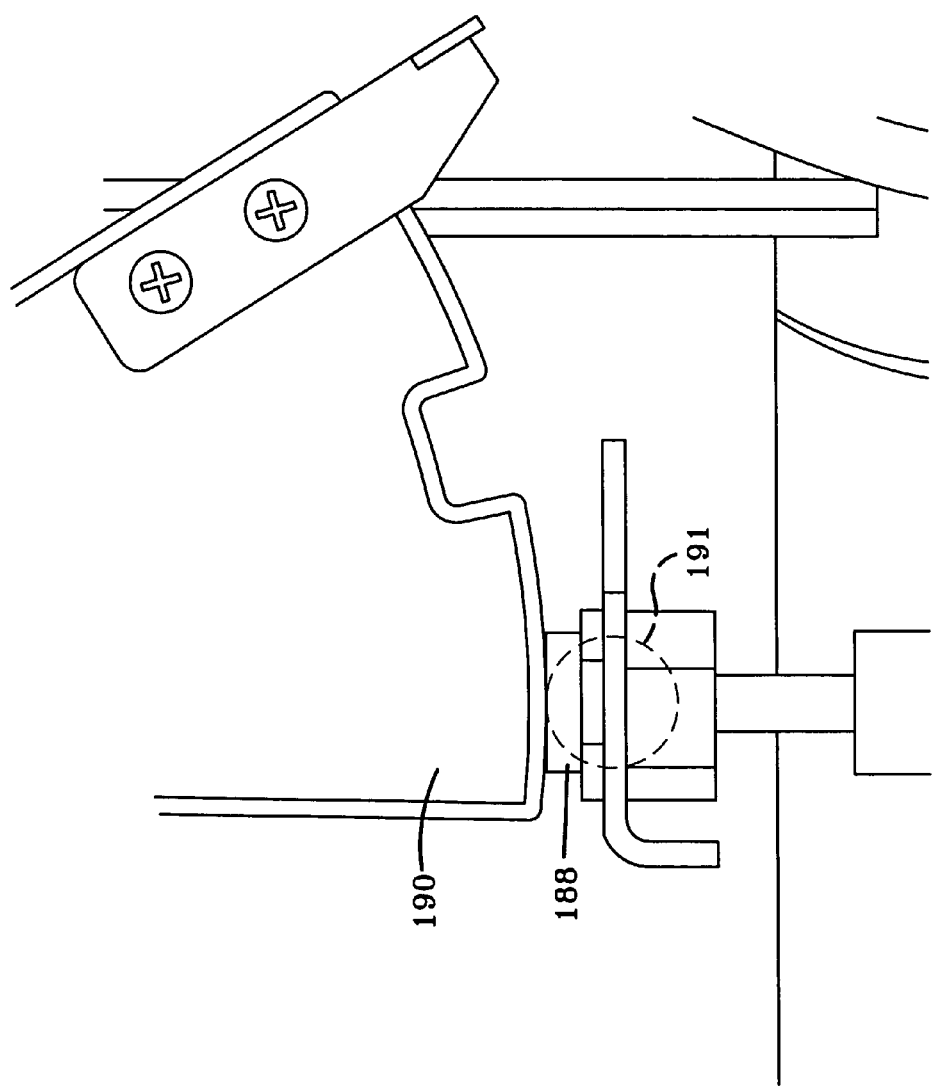

FIG. 22 is a close up view of the sensor in the second position.

Figure 23:
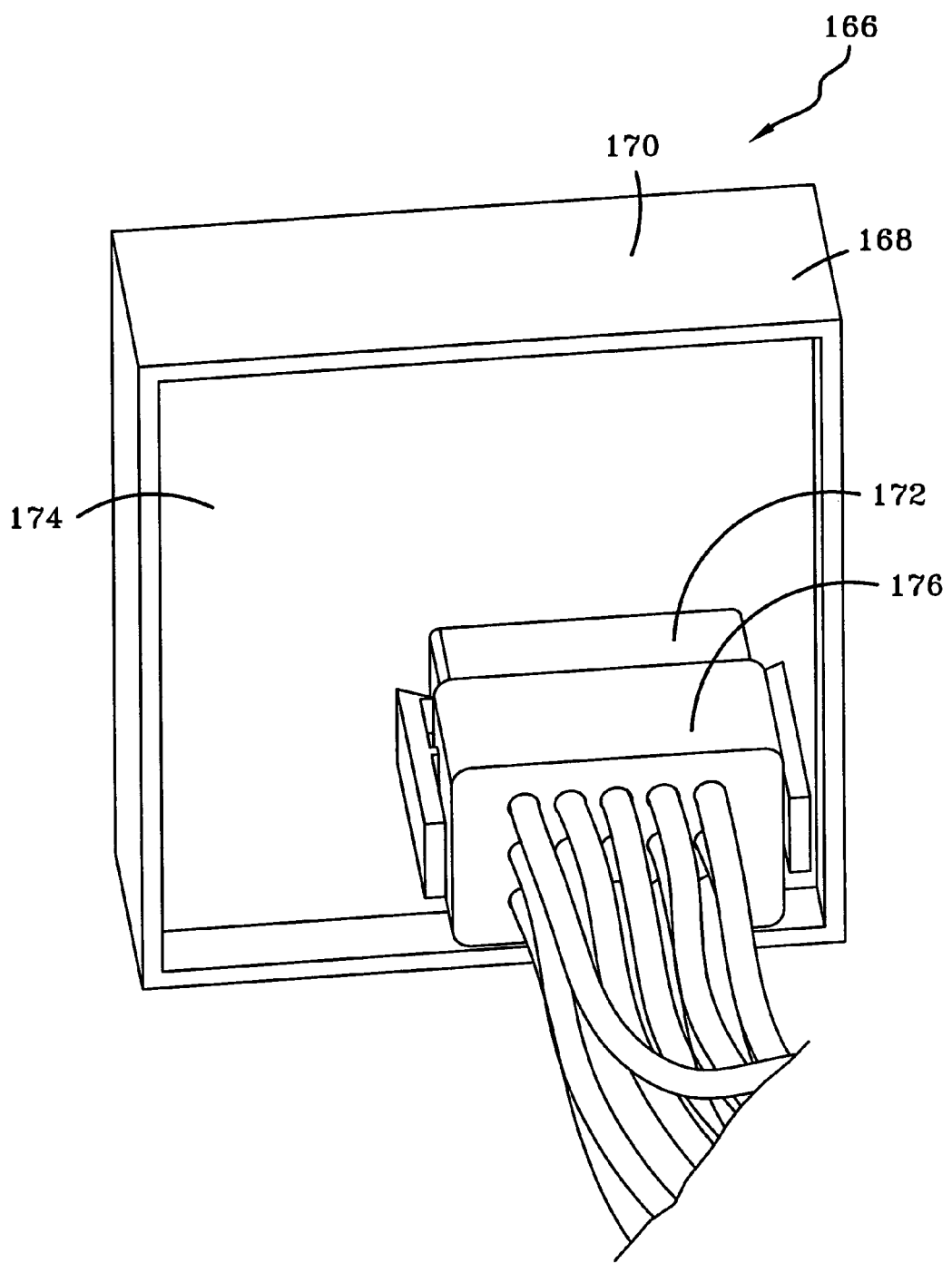

FIG. 23 is a close up view of the shift module in its connected position.

Figure 24:
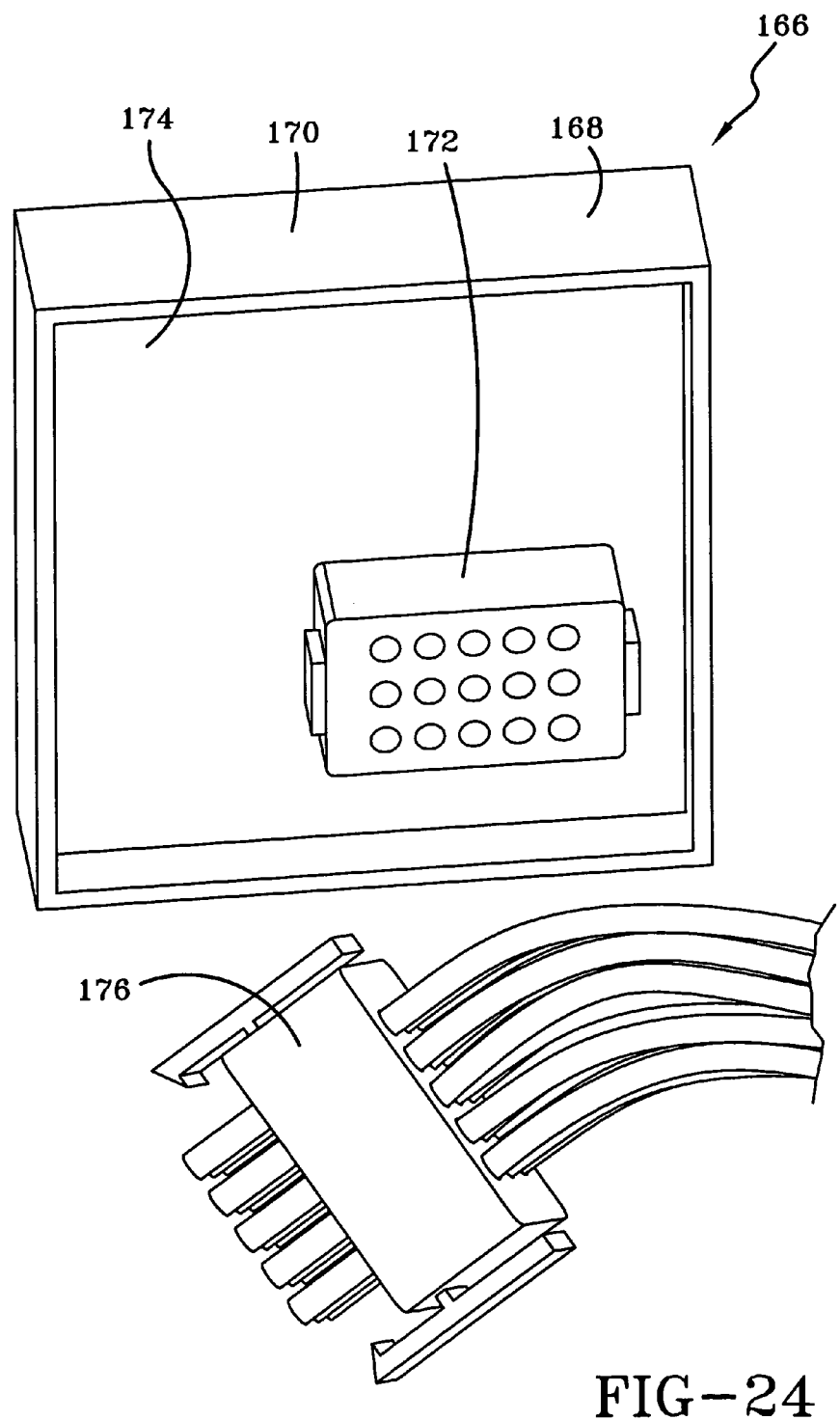

FIG. 24 is a close up view of the shift module in its disconnected position.

Figure 25:
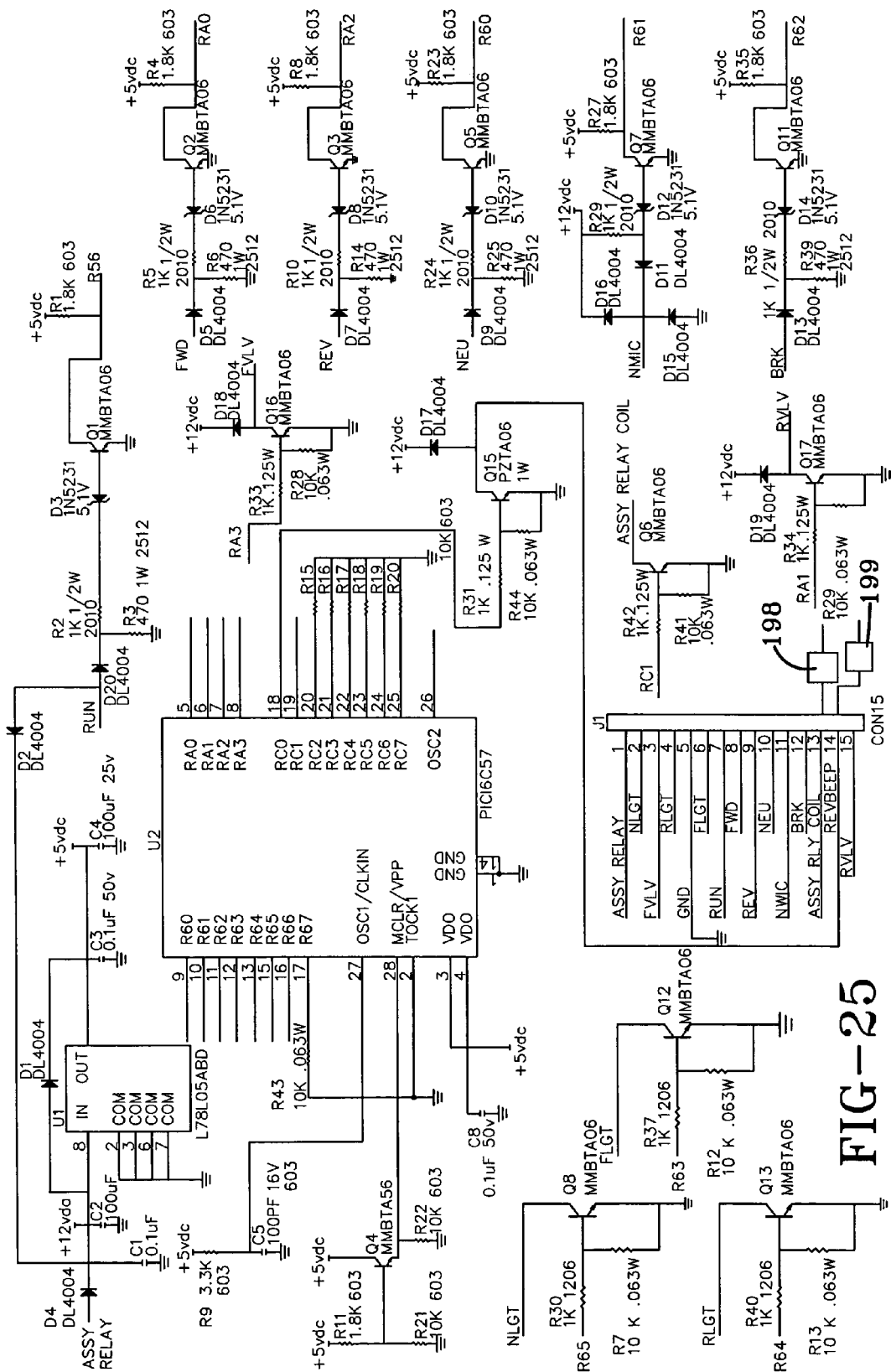

FIG. 25 is an electrical schematic of the control mechanism.

IV. DESCRIPTION OF THE PREFERRED EMBODIMENT

Figure 1A:
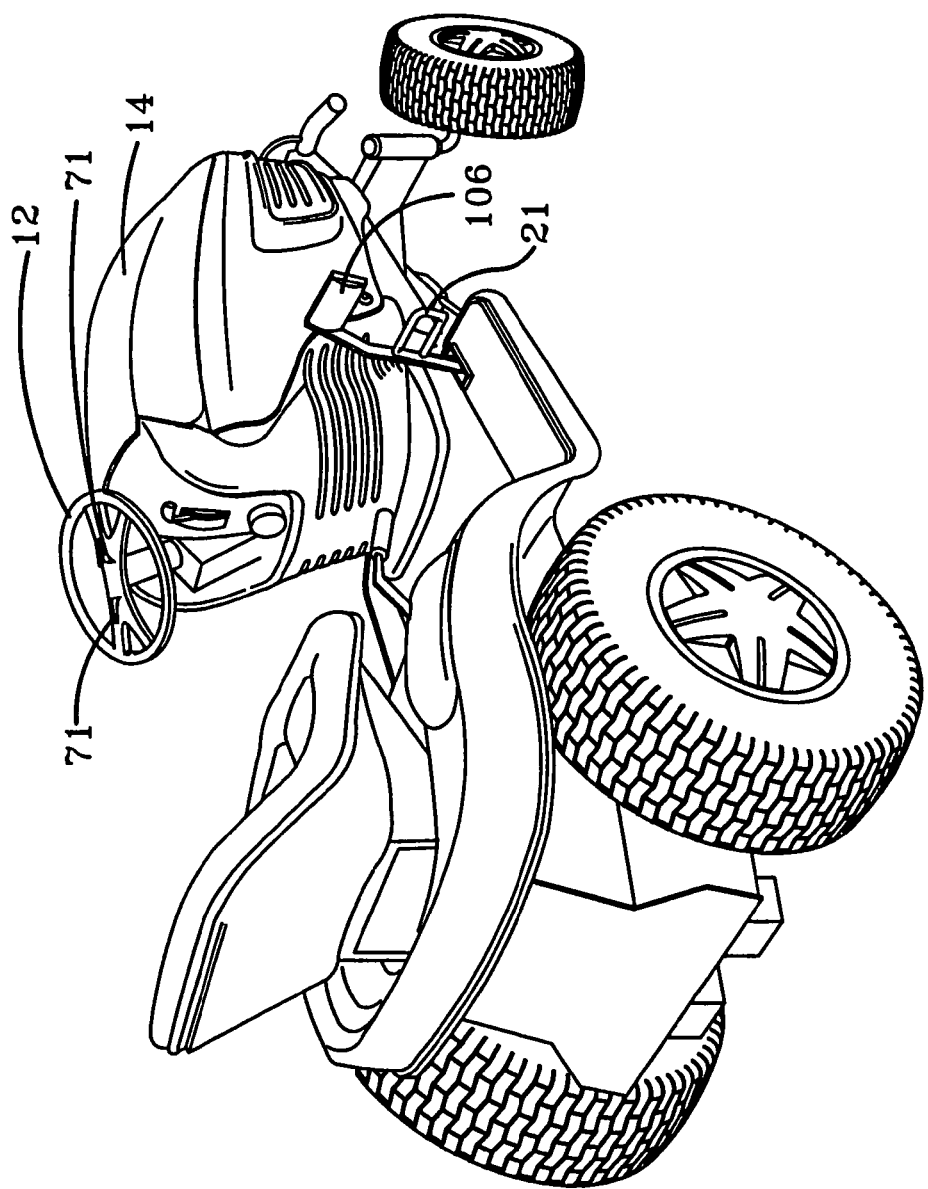
FIG. 1A is a back end perspective view of a lawn tractor incorporating the vacuum actuated direction and speed control of the present invention.
Figure 12:
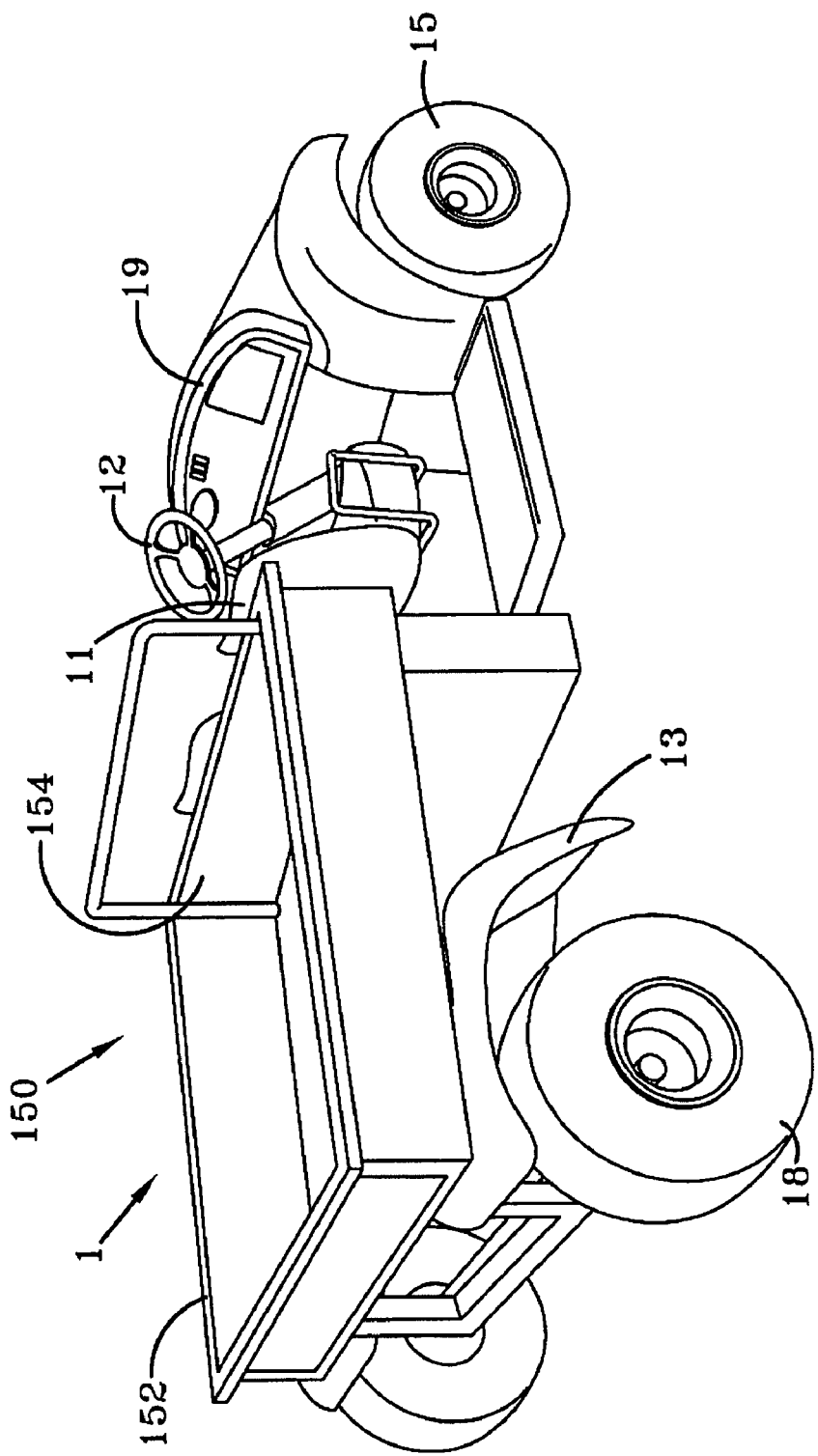
FIG. 12 is a side perspective view of a utility vehicle equipped with the control mechanism of the present invention.

Referring now to the drawings wherein the showings are for purposes of illustrating a preferred embodiment of the invention only and not for purposes of limiting the same, FIGS. 1 and 12 show vehicles 1 that are equipped with an electronic control system in accordance with this invention. More specifically in a first embodiment, shown primarily in FIGS. 1, 1A, and 8–10, the vehicle 1 is a lawn tractor 10 and in a second embodiment, shown primarily in FIGS. 12–18, the vehicle 1 is a utility vehicle 150. As is well known in the art, a utility vehicle is a type of off road vehicle that may be used for many different off-road purposes. For example the utility vehicle 150 shown in FIG. 12 contains a loading bed 152 that can be used to transport materials such as dirt, gravel, mulch, etc. Other types of utility vehicles (not shown) may have a flat loading bed that are used to transport other types of materials such as logs, railroad ties, landscape ties, etc. Still further the utility vehicle may be equipped with either a front or rear attachment used for plowing, raking, mowing, aerating, etc. It should be noted that the present invention can be used on either vehicle described above. It should be further noted that the present invention is not limited to the types of vehicles shown but is preferred to be used with an off the road vehicle such as other types of tractors, mowers, other vehicles and other applications as well.

Figure 2:
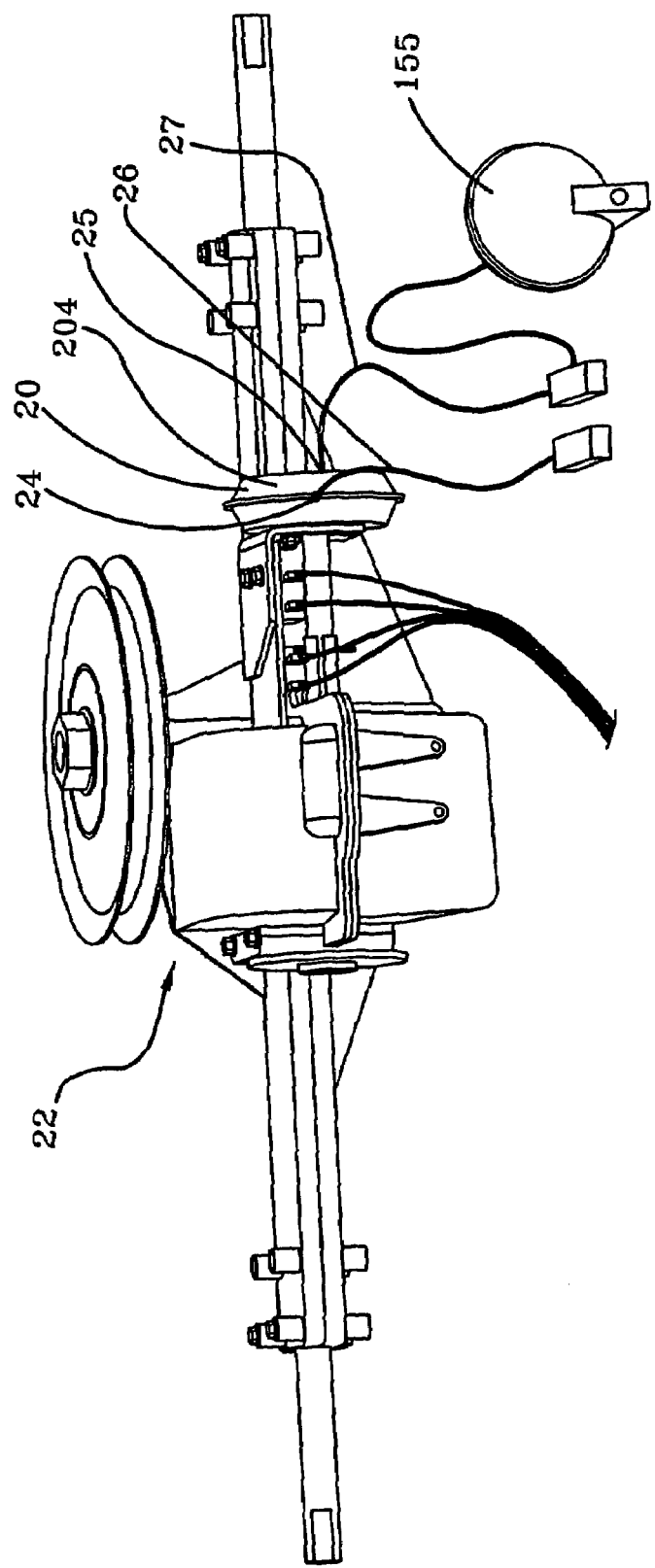
FIG. 2 is a perspective view of a transmission disassembled from a vehicle showing the connection of a vacuum actuator.

Referring to FIGS. 1 and 12, the vehicle 1 includes an operator seat 11, a frame 13, a steering implement 12 for turning front wheels 15 and an engine 14. The engine 14 can be of any type currently used in the art but preferably it includes a vacuum means such as an intake manifold (not shown). It should be noted that other vacuum means 155 such as a vacuum pump (not shown) could also be used to supply vacuum for this invention. Optionally but preferably, an accumulator 156 (shown in FIGS. 8 and 17) may be used in combination with the vacuum means 155 to increase the vacuum capacity. The engine 14 is used, as is commonly known in the art, to provide power to a transmission 22, as shown in FIGS. 2, 17, and 18 that provides power to drive wheels, back wheels 18 as shown, for providing locomotion for the vehicle 1.

Referring now to FIG. 1, the tractor 10 may include a cutting blade 23, positioned within a mower deck 16, and deck rollers 17 operatively attached to the deck 16 that, in conjunction with the frame 13, support the mower deck 16. Of course multiple cutting blades may used. The engine 14 is also used, as is commonly known in the art, to drive (or rotate) the cutting blades that rotate within a mower deck 16. The cutting blades can be of any type and thus are not shown in detail.

Figure 8:
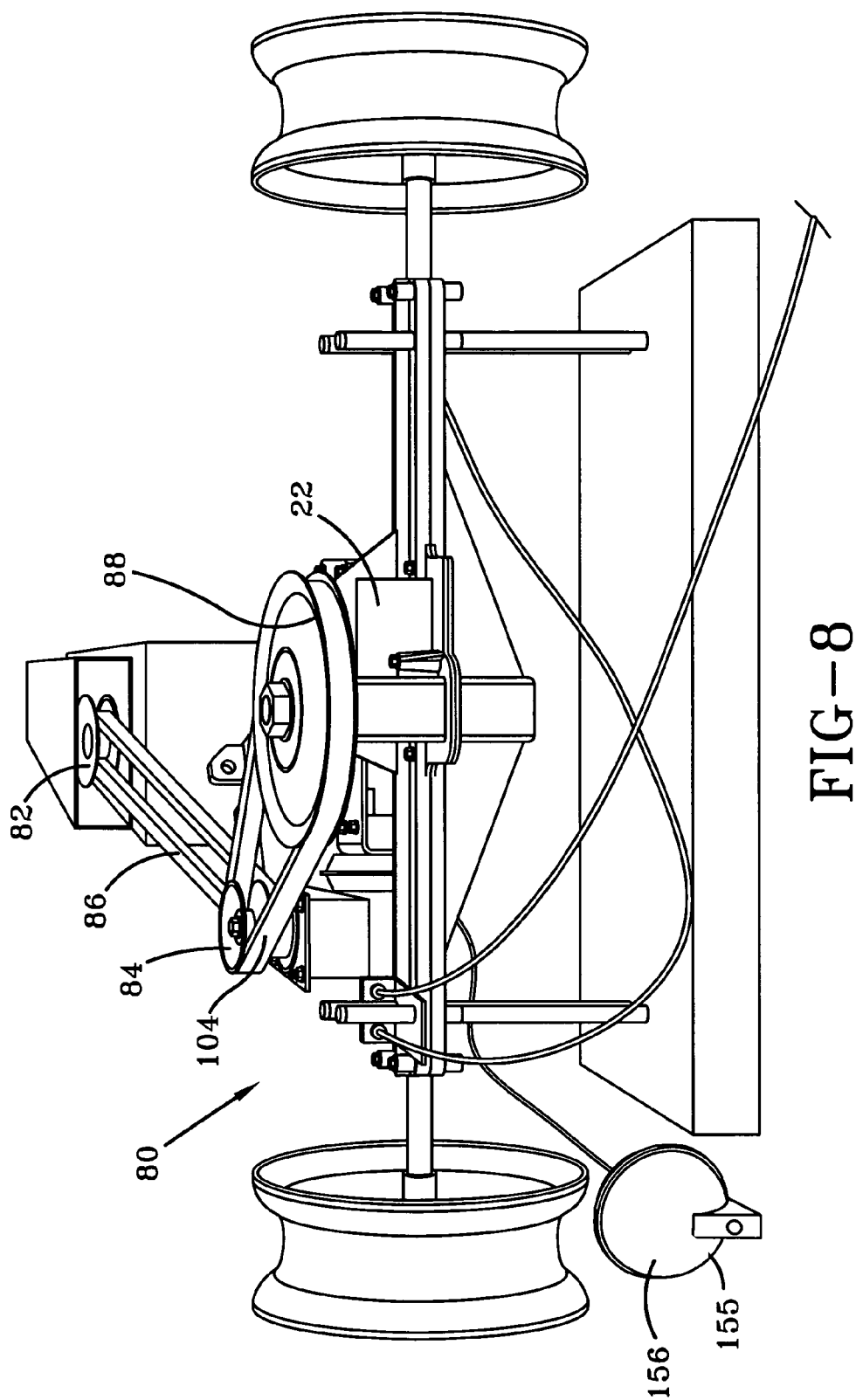
FIG. 8 is a perspective view of the drive system in a shop setting.
Figure 9:
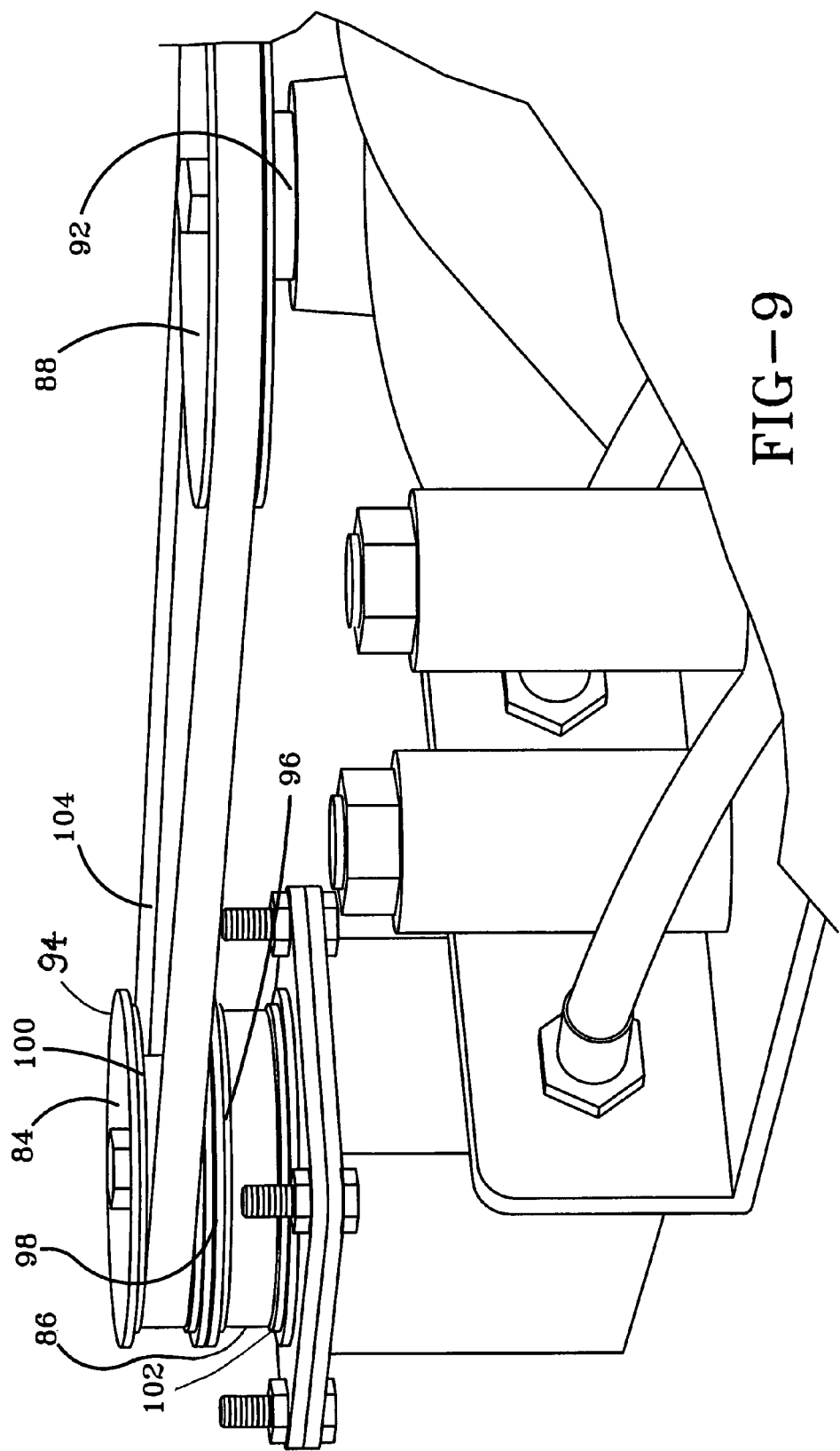
FIG. 9 is a close up view of the drive system of FIG. 8 showing the variator and the second belt system.
Figure 10:
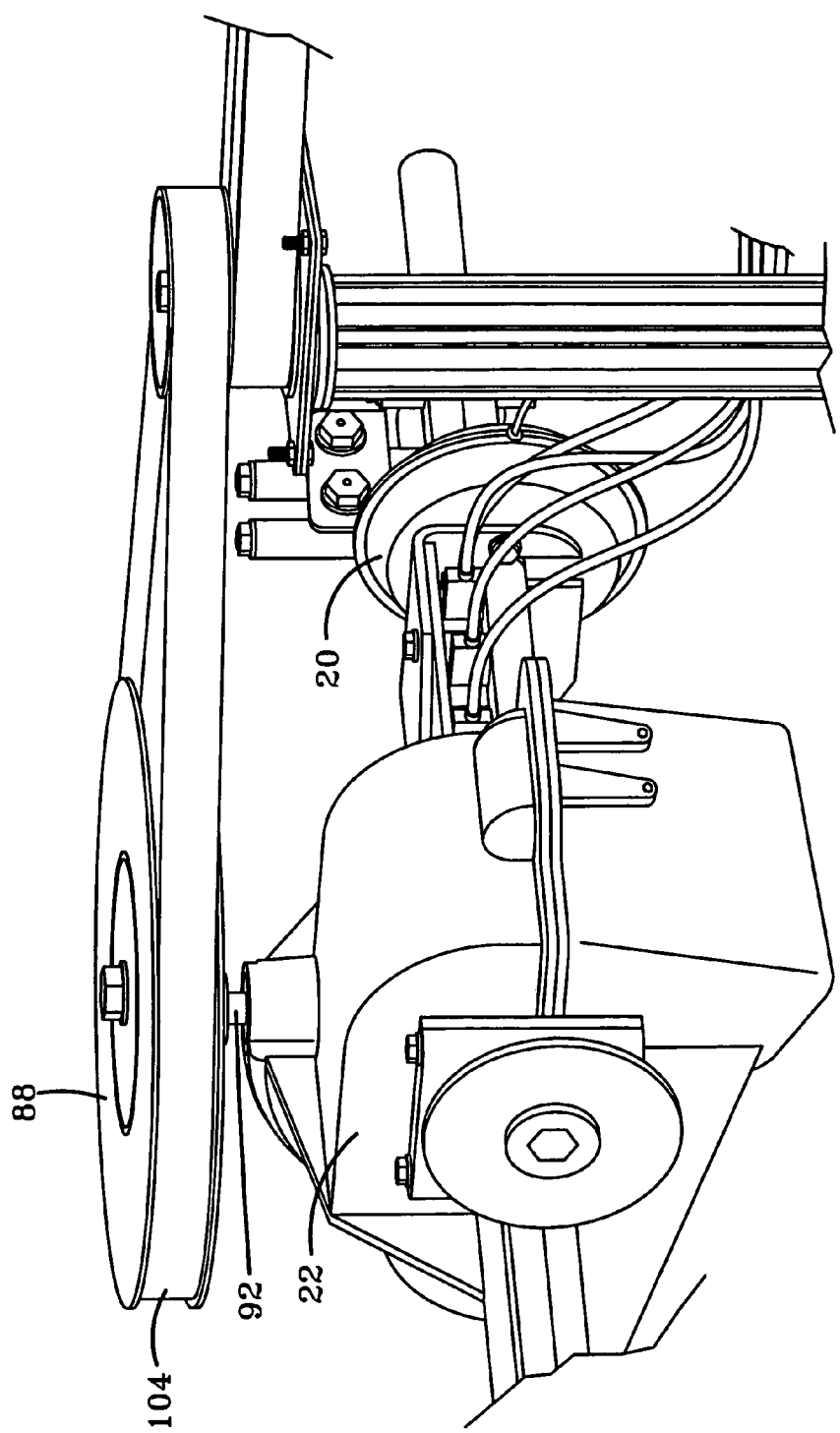
FIG. 10 is a close up perspective view of the drive system of FIG. 8 showing the vacuum actuated control mechanism and the transmission.

Referring to FIGS. 8, 9, and 10 a drive system 80 may include two belt systems. The first belt system operatively connects a drive pulley 82 that is operatively rotated by the engine 14, to one pulley of a variator 84 using drive belt 86. This first belt system may include an idler pulley (not shown) to maintain proper belt tension in the first belt system. As will be understood by those of ordinary skill in the art, the first belt system provides rotational power from the drive pulley to the variator 84.

With continuing reference to FIGS. 8, 9, and 10, the second belt system operatively connects the variator 84 to an input pulley 88 via a driven belt 104. The input pulley 88 is rotatably connected to the transmission input shaft 92 and thus to the transmission 22. Preferably, but optionally, the second belt system includes an idler pulley (not shown) that may be spring-biased to maintain proper belt tension in the second belt system. The variator 84 consists of two variable effective diameter pulleys, an upper pulley 94 and a lower pulley 96. The upper 94 and lower 96 pulleys share a common inner pulley member referred to as a slidable central disk 98. The disk 98 is selectively slidable in the axial direction between the outer sides (top and bottom as shown) of the variator 84 thereby selectively varying the diameter of both the upper 94 and lower 96 pulleys. In other words, when the disk 98 slides toward the top 100 of the variator 84 the effective diameter of the upper pulley 94 increases and the effective diameter of the lower pulley 96 decreases. The reverse takes place as the disk 98 slides toward the bottom 102 of the variator 84. When the operator starts the engine 14 the drive pulley 82, which is operatively connected to the engine 14, may rotate at a speed of approximately 400 rotations per minute. However, until the operator presses an accelerator pedal 21 there is no tension on the drive belt 86. Therefore, the drive belt 86 is not rotating and thus the tractor 10 is not moving. The drive belt 86 is connected to the drive pulley 82, the idler pulley (not shown) and the lower pulley 96 of the variator 84. When the operator presses the accelerator pedal 21 the idler pulley is physically moved such that tension is created in the drive belt 86. As the tension increases in the drive belt 86, the drive pulley 82 engages the variator 84 such that the variator is rotated. The rotation of the variator 84 in turn drives the input pulley 88 via the driven belt 104 (which is connected to the upper pulley 94 of the variator 84). The input pulley 88 in turn drives the transmission input shaft 92 thereby engaging the transmission 22 and propelling the vehicle 1 in the forward or reverse direction. As the operator further depresses the accelerator pedal 21 the displacement of the idler pulley increases thereby increasing the tension on the drive belt 86, which in turn increases the speed of the vehicle 1. FIG. 10 also illustrates the location of the vacuum actuator 20, with respect to the drive system 80 and transmission 22.

Referring specifically to FIGS. 12, 13, and 18, the utility vehicle 150 further contains a loading bed 152. The bed 152 can be used to store or transport material between destinations. Furthermore, the front end 154 of the bed 152 can be raised (as shown in FIG. 13) to facilitate the emptying of the bed 152. Located under the loading bed 152 is the drive system area 200. The drive system consists of an engine 14, transmission 22, a drive variable pulley 206 located on the engine 14 and a driven variable pulley 208 located on the transmission 22. A belt 210 connects the drive variable pulley 206 to the driven variable pulley 208. The drive system for the utility vehicle 150 operates overall to supply power in a similar manner as the drive system for the lawn tractor 10 and thus will not be discussed in further detail. However, it should be noted that the present invention works equally as well with both vehicles utilizing any type of drive system.

Figure 3:
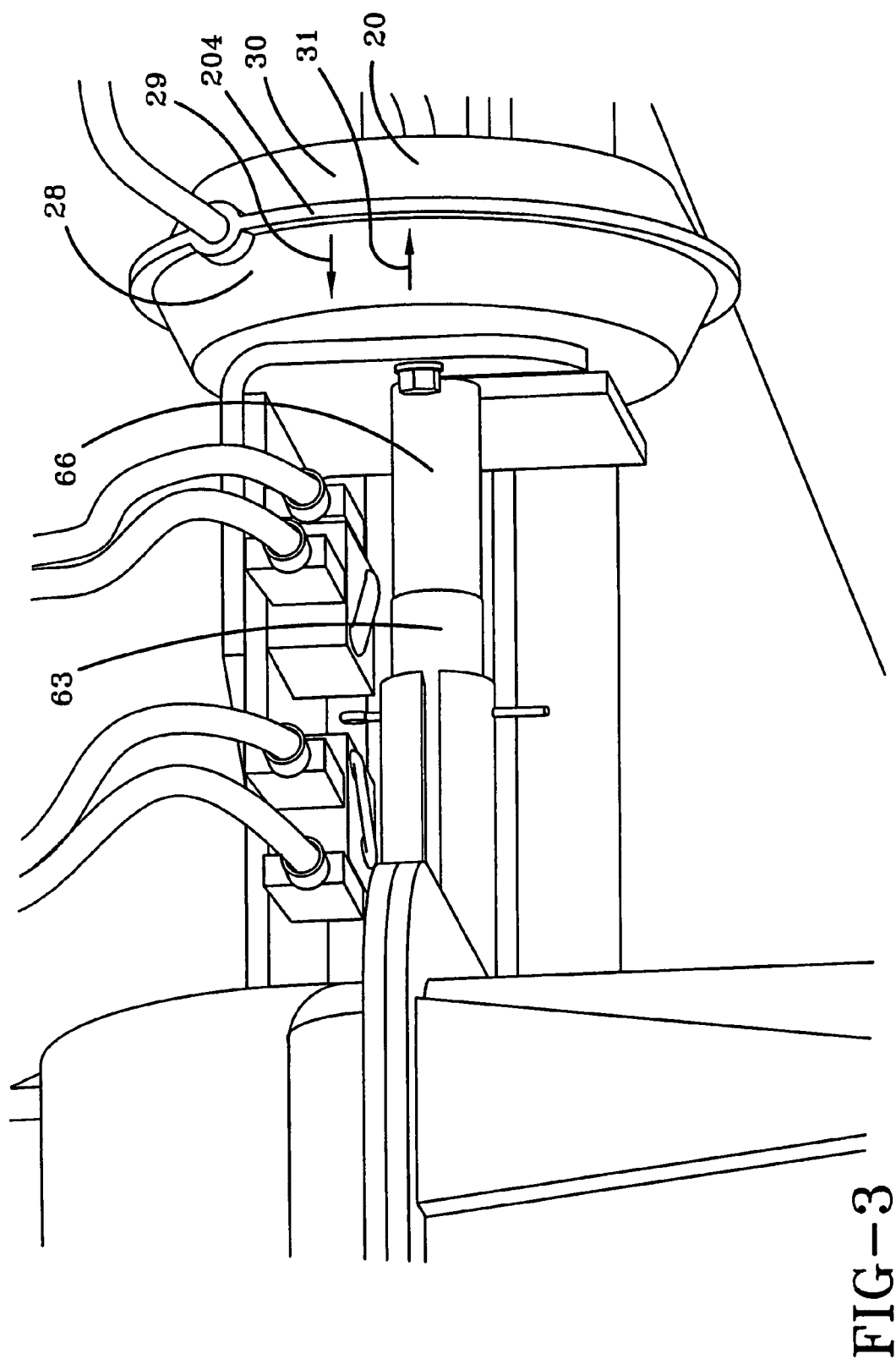
FIG. 3 is a close up perspective view of the transmission shown in FIG. 2 showing the operation of the vacuum actuator.

Referring to FIGS. 2 and 3, the present invention further includes an actuation means 204. In the preferred embodiment the actuation means 204 is a vacuum actuator 20 that may be connected to the transmission 22 for use on a vehicle 1. It should be noted the actuation means 204 may consist of any type of actuating means chosen with sound engineering judgment such as hydraulics, pneumatics, electric motor, etc. The actuation means 204 is used to shift the gears of the transmission 22 between the forward and reverse directions. Any vacuum actuator chosen with sound engineering judgment can be used for the vacuum actuator 20 of the present invention. The vacuum actuator 20 can be connected to the transmission 22 or the frame 13 for structural support by any means chosen with sound engineering judgment. In the preferred embodiment the vacuum actuator 20 is bolted to the transmission 22 as shown in FIG. 3. The vacuum actuator 20 has two connection ports 24, 25 and two vacuum lines 26, 27 for operative connection to the vacuum means 155. The vacuum actuator 20 has a first vacuum compartment 28 that causes an internal membrane (not shown) to move in a first direction 29 when a vacuum is established and move in a second direction 31 when the vacuum is diminished. The vacuum actuator 20 has a second vacuum compartment 30 that causes the internal membrane to move in the second direction 31 when the vacuum is established and move in the first direction 29 when the vacuum is diminished. The internal membrane is sealingly connected to the interior of the vacuum actuator 20 and can be moved in a first 29 or second 31 direction as described above. By sealingly it is meant that the air cannot pass through or around the membrane within the vacuum actuator 20. Fixedly connected to the membrane is an adjustable member 63 as shown in FIG. 3. In the preferred embodiment the adjustable member is an actuator rod 66. In the preferred embodiment the distal end (not shown) of the actuator rod 66 is threaded and extends through the center of the membrane. The preferred method for connecting the actuator rod 66 to the vacuum actuator 20 is by use of a nut and washer configuration (not shown) whereby washers are positioned directly opposite each other on either side of the membrane at the distal end of the actuator rod 66. Nuts are then used to tighten the washers against each other thereby clamping the actuator rod 66 to the membrane of the vacuum actuator 20. It should be noted that the actuator rod 66 can be connected to the vacuum actuator 20 by any means chosen with sound engineering judgment.

Referring to FIGS. 1A, 4, 11 and 15, the vacuum actuator 20 may be activated by a control circuit 32. To move the vehicle 1 in the forward or reverse direction the operator activates either the forward switch 33 or the reverse switch 34 respectively. In one embodiment the switches 33, 34 may be activated, via a control mechanism 166, by an activating means such as a rocker pedal (not shown). When the foot pedal is rotated in the forward direction the forward switch 33 is activated and when the foot pedal is rotated in the reverse direction the reverse switch 34 is activated. In another embodiment the switches 33, 34 may be activated, via a control mechanism 166, by an activating means 71 such as push buttons 72, 74 located in the steering wheel 12 or push buttons 158, 160, 162 located in the dashboard 19. It should be noted that the activating means 71 can be positioned in any location chosen with sound engineering judgment. When the forward push button 72, 158 is pressed the forward switch 33 is activated and when the reverse push button 74, 162 is pressed the reverse switch 34 is activated. The control mechanism 166 is shown in FIGS. 23 and 24 and will be described in detail further below.

Figure 4:
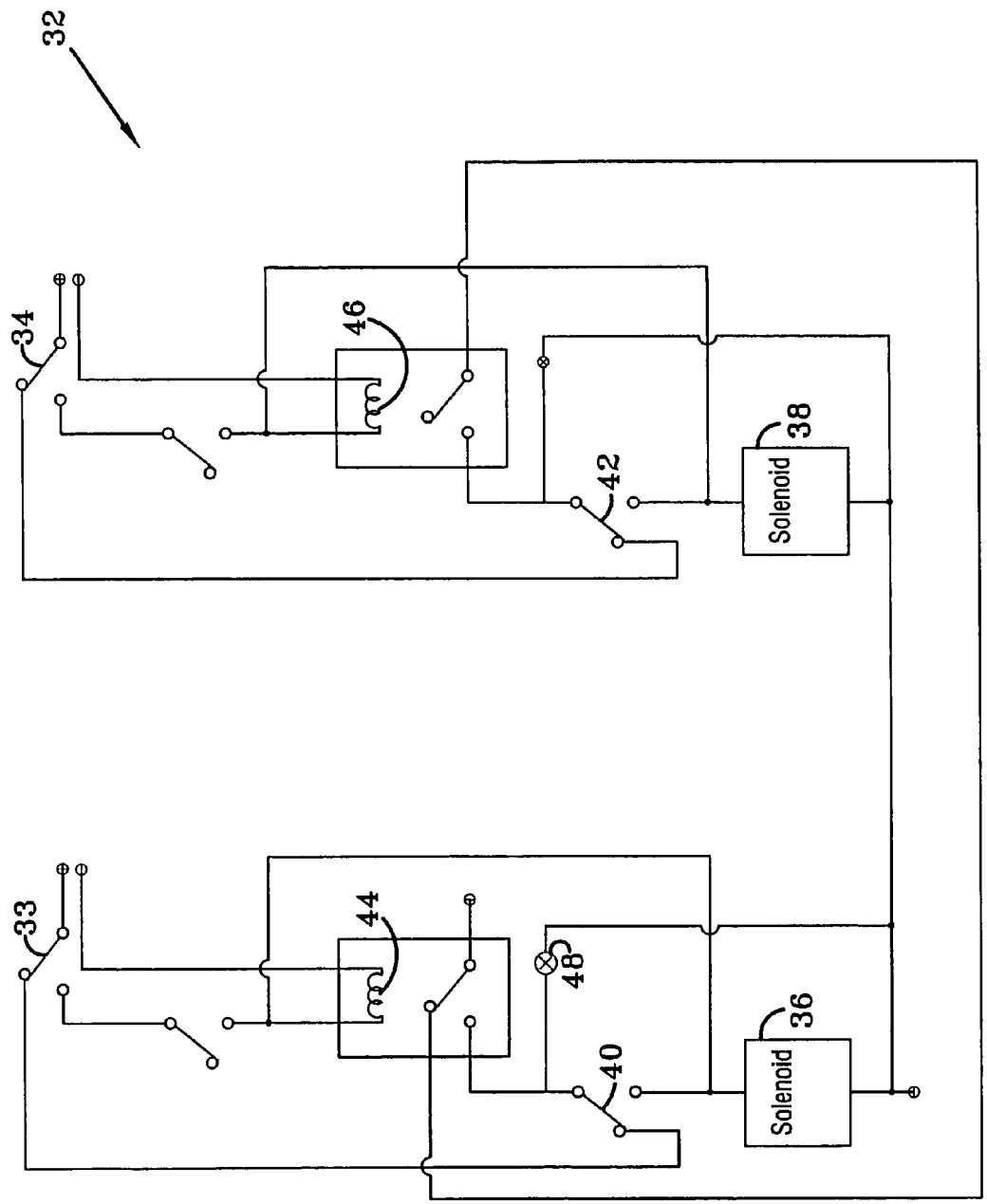
FIG. 4 is an electrical schematic of the control circuit that controls the actuation of the vacuum actuator.
Figure 6:
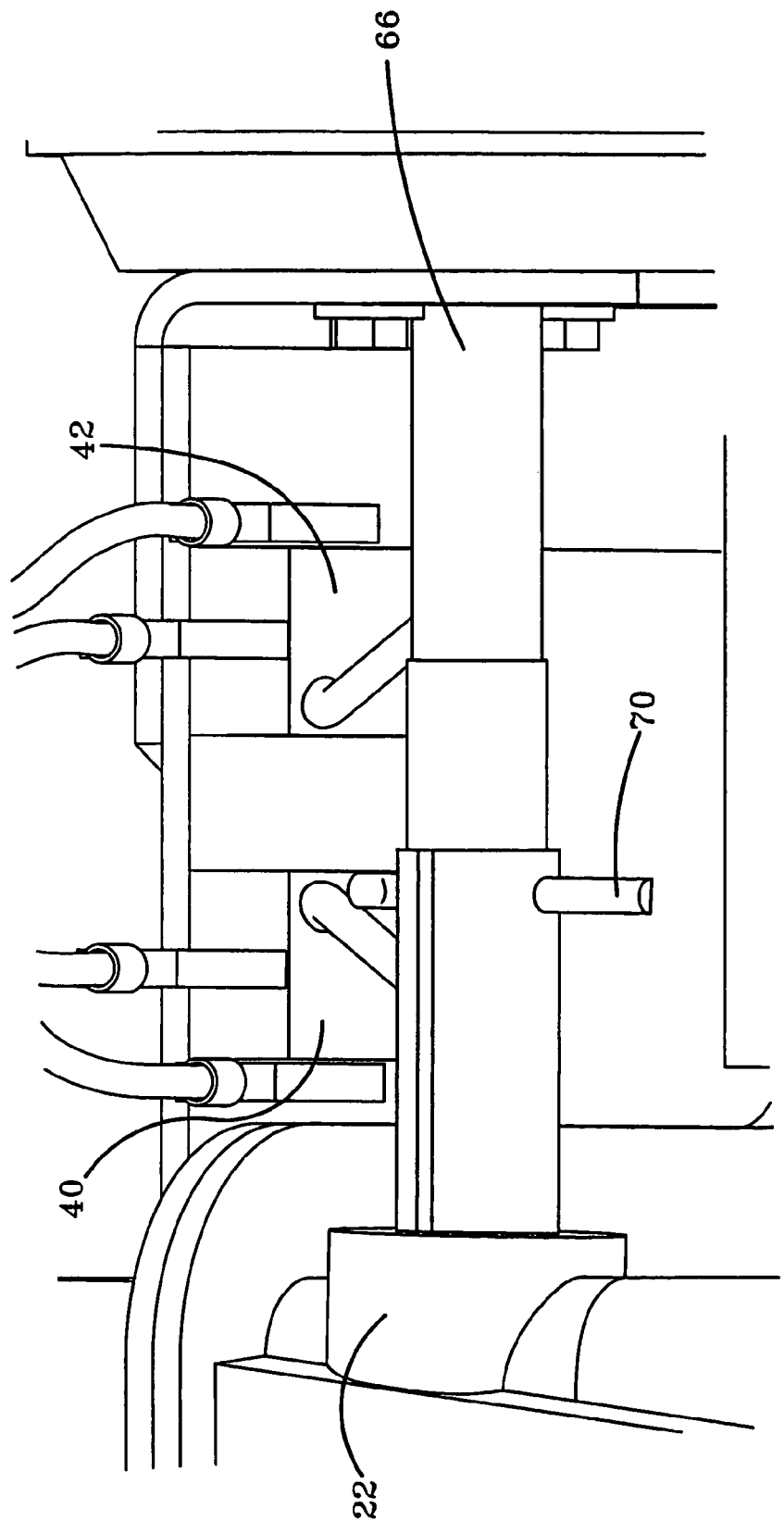
FIG. 6 is a close up view showing the connection of the switches to the transmission.

With continuing reference to FIGS. 2 and 4 the control circuit 32 that activates the vacuum actuator 20 will now be described. The control circuit 32 further includes two solenoid valves 36, 38. The first solenoid valve 36 is used in conjunction with the forward switch 33 to move the vehicle 1 in the forward direction. The second solenoid valve 38 is used in conjunction with the reverse switch 34 to move the vehicle 1 in the reverse direction. As is commonly known in the art, a solenoid valve is selectively opened and closed using electromagnetism. When the solenoid valve 36, 38 is closed, air cannot flow between the vacuum means 155 and the vacuum actuator 20. When the solenoid valve 36, 38 is open, however, air flows from the vacuum actuator 20 through the open solenoid valve and into the vacuum means 155. Therefore, when the solenoid is in the open position a vacuum is established and maintained within the vacuum actuator 20. The control circuit 32 further includes two cut off switches 40, 42 and relays 44, 46. The cut off switches 40 and 42 are normally closed switches that are mounted to the transmission 22 as shown in FIG. 6. Therefore, when the cut off switches 42 and 44 are activated they open thereby interrupting the circuit as will be explained below. The cut off switches 42 and 44 can be mounted by any mechanical means chosen with sound engineering judgment. In the preferred embodiment the cut off switches 42 and 44 are bolted to the transmission 22.

Figure 11:
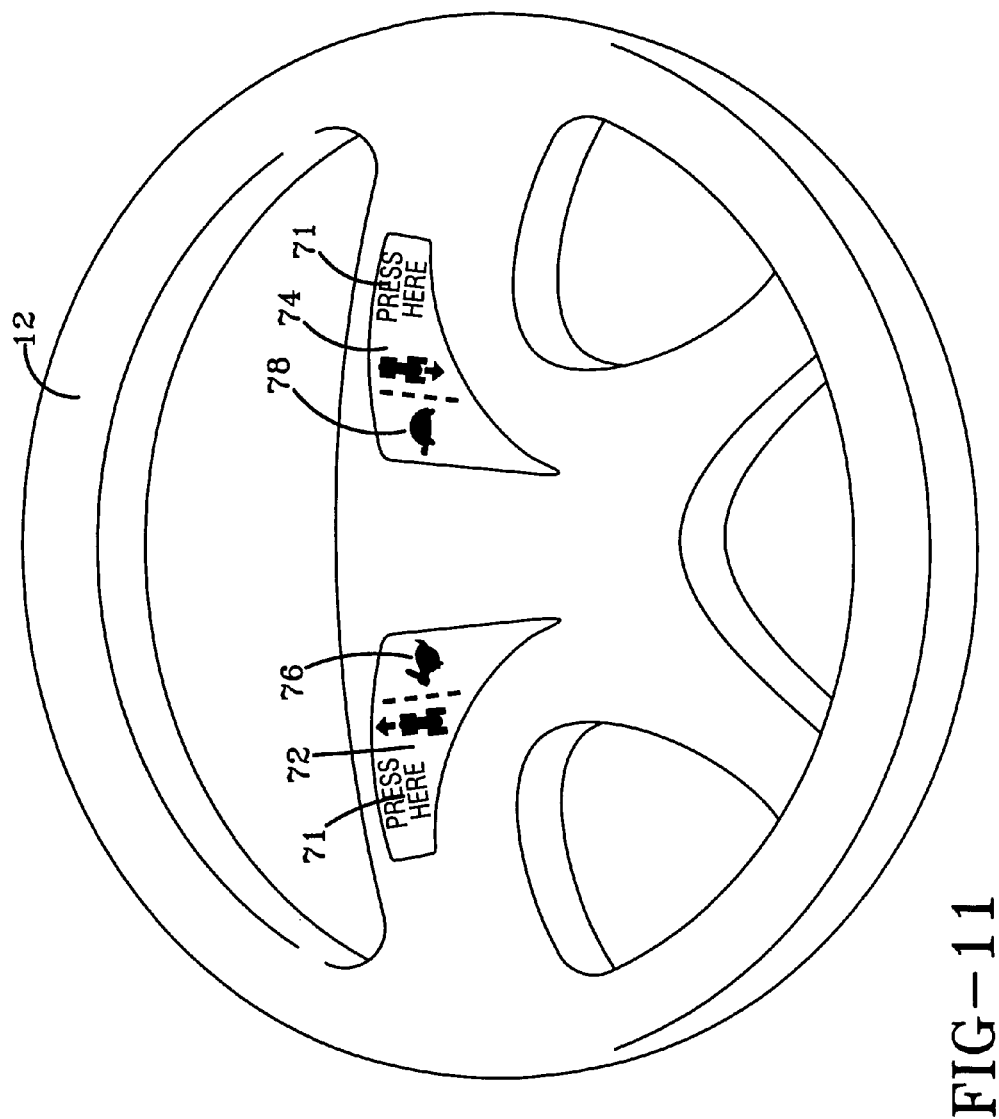
FIG. 11 is a close up view of the steering wheel of the lawn tractor of FIG. 1A showing control buttons used for the activating means.
Figure 15:
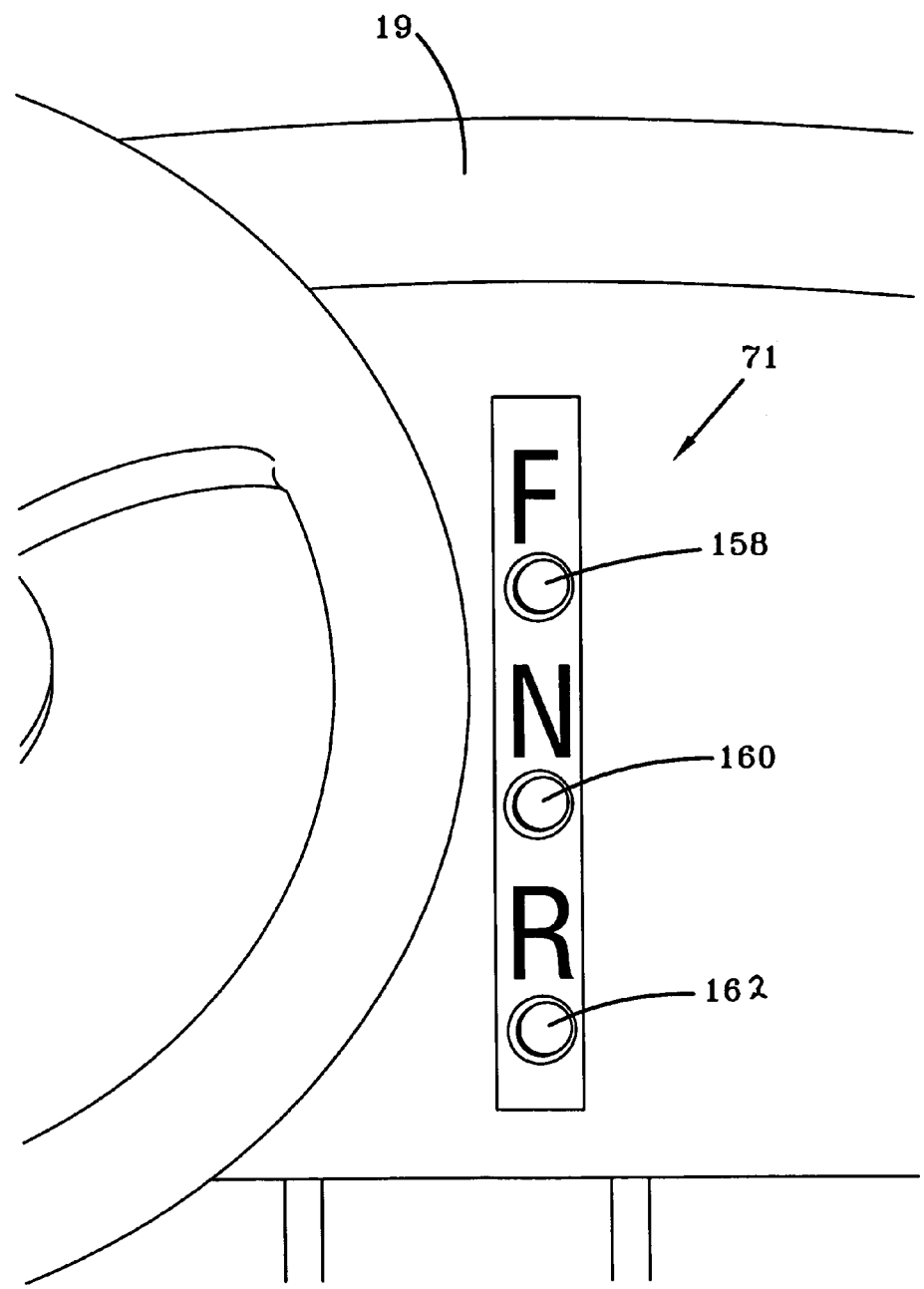
FIG. 15 is a close up view of the dashboard of FIG. 14 showing the pushbuttons.

Still referring to FIGS. 2 and 4 the operation of the control circuit 32 will now be described. While the operator is sitting on the vehicle 1, in order to move the vehicle 1 in the forward direction, the operator activates the forward switch 33 by depressing the forward push button 72, 158 as described above. The control mechanism 166, shown in FIG. 23, sends a signal to the forward switch 33 thereby closing the switch 33 and activating the circuit. By closing the forward switch 33, an electric signal is sent to the relay 44 thereby energizing the relay 44. The relay 44 closes thus completing the circuit and allowing power to flow to the solenoid 36, thereby energizing the solenoid 36. Once the solenoid 36 is energized, the solenoid 36 opens and allows air to flow from the vacuum actuator 20 to the vacuum means 155, thereby creating a vacuum in the first vacuum compartment 28. As the vacuum forms in the first vacuum compartment 28, the internal membrane of the vacuum actuator 20 moves in the first direction 29 and pushes on the actuator rod 66. The actuator rod 66 shifts the gears of the transmission 22 to allow the vehicle 1 to move in the forward direction. At this time an indicator light 48 is also energized to inform the operator that the forward circuit is energized. Once the transmission 22 has shifted gears and the vehicle is moving in the forward direction, the shift pin 70 (FIG. 6) contacts and activates the cut off switch 40. The cut off switch 40 is opened and interrupts the circuit thereby de-energizing the solenoid 36. As the solenoid 36 closes it stops the airflow from the vacuum actuator 20 to the vacuum means 155 thereby diminishing the vacuum in the vacuum actuator 20. As the vacuum diminishes the internal membrane of the vacuum actuator 20 moves in the second direction 31 back to its original position. It should be noted that when the cut off switch 40 is activated and opens the solenoid 36 thereby diminishing the vacuum within the vacuum actuator 20, the vehicle 1 still continues to move in the forward direction as long as the operator continues to activate the forward switch 33. The operator can deactivate the forward switch 33 by either depressing the brake 106 as shown in FIGS. 1A and 14 or depressing the neutral push button 160 as shown in FIG. 15. Once the operator deactivates the forward switch 33 the vehicle 1 will cease to move in the forward direction. To operate the vehicle 1 in the reverse direction the same electrical and mechanical sequence previously described is performed with the reverse switch 34, the cut off switch 42, the relay 46 and the second solenoid 38. The only difference is that in order to move the vehicle 1 in the reverse direction the operator must activate the reverse push button 74 162 as shown in FIGS. 11 and 15 to activate the reverse switch 34.

Referring to FIGS. 23–24 the control mechanism 166 may consist of a shift module 168. The shift module 168 is a microprocessor based device that further consists of a housing 170, a first connector 172, and various electrical components (shown schematically in FIG. 25) that are commonly known in the art such as a microprocessor, resistors, capacitors, diodes and transistors. The housing 170 can be made of any suitable rigid material chosen with sound engineering judgment. In the preferred embodiment the first connector 172 is a 15-pin female connector, although any pin and type connector can be used chosen with sound engineering judgment. The electrical components along with the connector 172 are placed inside the housing 170 and are sealed in place by an encapsulating material 174. A second connector 176 is connected to the first connector 172 to allow the shift module 168 to communicate with both the activating means and the control circuit 32. In the preferred embodiment the second connector 176 is a 15-pin male connector, although any pin and type connector can be used chosen with sound engineering judgment. The purpose of the shift module 168 is to communicate an output signal to the control circuit 32 when the module 168 receives an input signal from either; 1) activation of an activating means from the operator, or 2) from the sensing mechanism 187. More specifically, when the operator activates an activating means such as a push button 72, 74, 158, 160, 162 a signal is sent to the shift module which in turn sends a signal to the control circuit 32. The shift module 168 can receive multiple input signals from the operator such as a forward, reverse, neutral, or brake signal. An additional input signal is generated by a sensing mechanism 187 that senses if the vehicle is in neutral or is not in neutral (hereinafter "not neutral").

Referring to FIGS. 18–22, the sensing mechanism 187 further consists of a sensor 188, and a sensor detector 190. In the preferred embodiment the sensor 188 is a ball switch. However, it should be noted that the sensor can be any type of sensor chosen with sound engineering judgment. The ball switch sensor 188 further consists of a ball 191, a housing 192 and a contact or relay (not shown) located inside the housing 192. As will be explained below, the sensor 188 sends a neutral or not neutral signal to the shift module 168. As shown in FIG. 19, the sensor detector 190 is operatively connected to the transmission 22. In the preferred embodiment the sensor detector 190 is triangular in shape that includes an arcuate portion 193 at the bottom and a notch 197 that is centrally located within the arcuate portion 193. It should be noted that the sensing detector 190 can be any shape chosen with sound engineering judgment. Located at the top of the sensor detector 190 is a rounded hub 194. The hub 194 further includes an aperture 196 to receive the transmission rod 195. As will be explained below, the transmission rod 195 is operatively connected to the transmission 22 and ultimately shifts the transmission 22 between forward, reverse and neutral. Also connected to the sensing mechanism 187 is the actuator rod 66. As previously explained the actuator rod 66 is operatively connected to the vacuum actuator 20.

Referring to FIGS. 18–24, operation of the shift module 168 and the sensing mechanism 187 will now be described. At the start of operation of the vehicle 1, the sensing mechanism 187 is in the neutral state as shown in FIG. 19. When the operator attempts starts the engine 14 the sensor 188 sends a neutral signal to the shift module 168 that tells the shift module 168 that the vehicle 1 is in neutral. If the shift module 168 does not receive a neutral signal from the sensor 188 the shift module will not permit the vehicle 1 to start. When the operator depresses the forward push button 158 (FIG. 15) or 72 (FIG. 11), a forward input signal is sent to the shift module 168. The shift module 168 then sends a signal to the control circuit 32 which in turn activates the vacuum actuator 20 as described above. The internal membrane (not shown) of the vacuum actuator 20 pushes the actuator rod 66 in a first direction 29. The actuator rod 66 in turn pushes on the sensor detector 190 causing the sensing detector 190 to pivot about the radial axis of the aperture 196 as shown in FIG. 21. This in turn causes the transmission rod 195 to rotate thereby shifting the transmission 22 to the forward direction. In addition, as the sensor detector 190 rotates the arcuate portion 193 contacts the ball 191 on the ball switch sensor 188 and pushes the ball 191 into the housing 192. As the ball 191 descends into the housing 192 it contacts the relay or contact (not shown) and closes an electrical circuit that sends a signal to the shift module 168 informing the shift module 168 that the vehicle 1 is no longer in neutral. Therefore, the controller (not shown) located in the shift module 168 now senses that the vehicle is in forward because the shift module received two input signals; 1) a forward input signal from the operator and, 2) a not neutral input signal from the sensor 188. The combination of these two signals tells the controller that the vehicle 1 is in forward. Furthermore, the vacuum actuator 20 will remain energized in the first direction 29 until the operator activates another activating means 71 such as the reverse 162 or neutral 160 pushbuttons.

Now when the operator depresses the reverse push button 162, the internal membrane of the vacuum actuator 20 pulls the actuator rod 66 in a second direction 31 as explained above. The actuator rod 66 in turn pulls the sensor detector 190 causing the sensing detector 190 to pivot in the second direction 31 about the radial axis of the aperture 196. As the sensor detector 190 pivots, the ball 191 disengages from the arcuate portion 193 as it reaches the notch 197. As the ball reaches the notch 197 the ball 191 will ascend in the housing 192 thereby disengaging itself from the contact or relay. This will in turn send a signal to the controller informing the shift module 168 that the transmission 22 is in neutral. After the neutral signal is received by the shift module 168, the shift module will send a signal to the control circuit 32 to continue with the shifting process to reverse. This process causes the transmission rod 195 to rotate thereby shifting the transmission 22 to the reverse direction. If the neutral signal is not received by the shift module 168 the shift module will still permit the transmission 22 to shift into reverse, however a fault code will be generated informing the operator that there may be a problem with the sensing mechanism 187 because the sensor 188 did not sense neutral within a predetermined period of time. Therefore, the controller (not shown) located in the shift module 168 now senses that the vehicle is in reverse because the shift module received two input signals; 1) a reverse input signal from the operator and, 2) a neutral input signal from the sensor 188. The combination of these two signals tells the controller that the vehicle is in reverse. Furthermore, the vacuum actuator 20 will remain energized in the second direction 31 until the operator activates another activating means 71 such as the forward 158 or neutral 160 pushbuttons. In addition, when the shift module 168 verifies that the vehicle 1 is in reverse an audible device 199 will generate an audible signal indicating that the vehicle 1 is in reverse.

In order to shift the vehicle 1 into neutral the operator depresses the neutral button 160 which in turn sends an input signal the shift module 168. The shift module 168 then sends a signal to the control circuit 32 which in turn activates the vacuum actuator 20 as described above. The internal membrane (not shown) of the vacuum actuator 20 either pushes or pulls the actuator rod 66 in the first 29 or second direction 31 respectively, depending if the transmission 22 is in forward or reverse. The actuator rod 66 in turn pushes or pulls the sensor detector 190 causing the sensing detector 190 to pivot about the radial axis of the aperture 196 as shown in FIG. 21. As the sensor detector 190 pivots the ball 191 disengages from the arcuate portion 193 as it reaches the notch 197. As the ball reaches the notch 197, the ball 191 will ascend in the housing 192 thereby disengaging itself from the contact or relay. The sensor 188 then sends a signal to the controller informing the shift module 168 that the transmission 22 is in neutral. Because the shift module 168 received two neutral signals, one from the operator and one from the sensor 188, the shift module will sense that the vehicle 1 is in neutral and send an output signal to the actuator 20 to discontinue movement. Therefore, the controller (not shown) located in the shift module 168 now senses that the vehicle is in neutral because the shift module received two input signals; 1) a neutral input signal from the operator and, 2) a neutral input signal from the sensor 188.

The shift module 168 also employs a self-correcting feature whereupon when shifting to the neutral position, the shift module 168 will continue to verify that the vehicle 1 is in neutral until another input is received from the operator or the vehicle 1 is powered down. This feature permits the shift module 168 to insure that the transmission 22 is in neutral in the event that an over-shift occurs. In other words, if the sensor detector 190 goes past neutral the shift module 168 will send the appropriate signal to the control circuit 32 to bring the sensor detector 190 back to the neutral position. It should be noted that the operator must first depress the brake 106 prior to any shifting operation. In other words, the control mechanism 166 must first sense an input from the brake 106 before it will shift the transmission 22. If the operator fails to depress the brake 106 prior to shifting, the control mechanism 166 will look for an input signal from the brake 106. If no input signal is received, the control mechanism 166 will not perform any function, therefore, the vehicle 1 will remain in its present state. When the operator wants to power down the vehicle 1, the operator depresses the neutral pushbutton 160 to return the transmission 22 to neutral as described above and then turns the key to the off position. However, if the operator does not activate the neutral pushbutton 160 prior to turning the key to the off position and the vehicle 1 is in forward, reverse, or in a fault condition, the engine will shut off immediately but the shift module 168 will send a signal to the control circuit 32 to shift the transmission 22 to the neutral position prior to powering down the electronic components of the vehicle 1. During the power down operation the shift module 168 also controls a power-down latching relay 198 (FIG. 25). Once the shift module 168 verifies that the vehicle 1 is in neutral, the shift module 168 will open the power-down latching relay 198 thereby powering down the electronic components of the vehicle 1.

Referring to FIG. 16, located on the dashboard 19 is an indicating light panel 178 that serves two functions; 1) it informs the operator if the vehicle 1 is in forward, reverse or neutral and 2) it serves as a fault code indicator if a problem has occurred and the vehicle is unable to perform a shift operation. Located on the indicating panel 178 are three indicating lights 180, the forward indicating light 182, the reverse indicating light 184 and the neutral indicating light 186. When the vehicle is in forward, reverse or neutral as described above the respective indicating light 180 will illuminate. Regarding the fault codes, if a problem occurs in the shifting operation of the vehicle 1 two or more indicating lights 180 will flash and the audible device 199 will generate a fast paced audible signal for a predetermined period of time informing the operator that a fault has occurred. For example, if a vacuum line dislocates or a switch becomes dislodged or any other type of mishap that prevents the operator from shifting, the control mechanism 166 will sense that a neutral signal was not received from the sensing mechanism 187 and will give a fault code after a predetermined period of time. In other words, the control mechanism 166 will be looking for a neutral input from the sensing mechanism 187 because the operator input a forward or reverse signal. When the control mechanism 166 does not receive the neutral signal a fault code will appear on the indicating panel 178. A fault code may consist of two or more indicating lights 180 illuminating. Depending on the type of fault that occurs will dictate which indicating lights 180 will illuminate.

Figure 5:
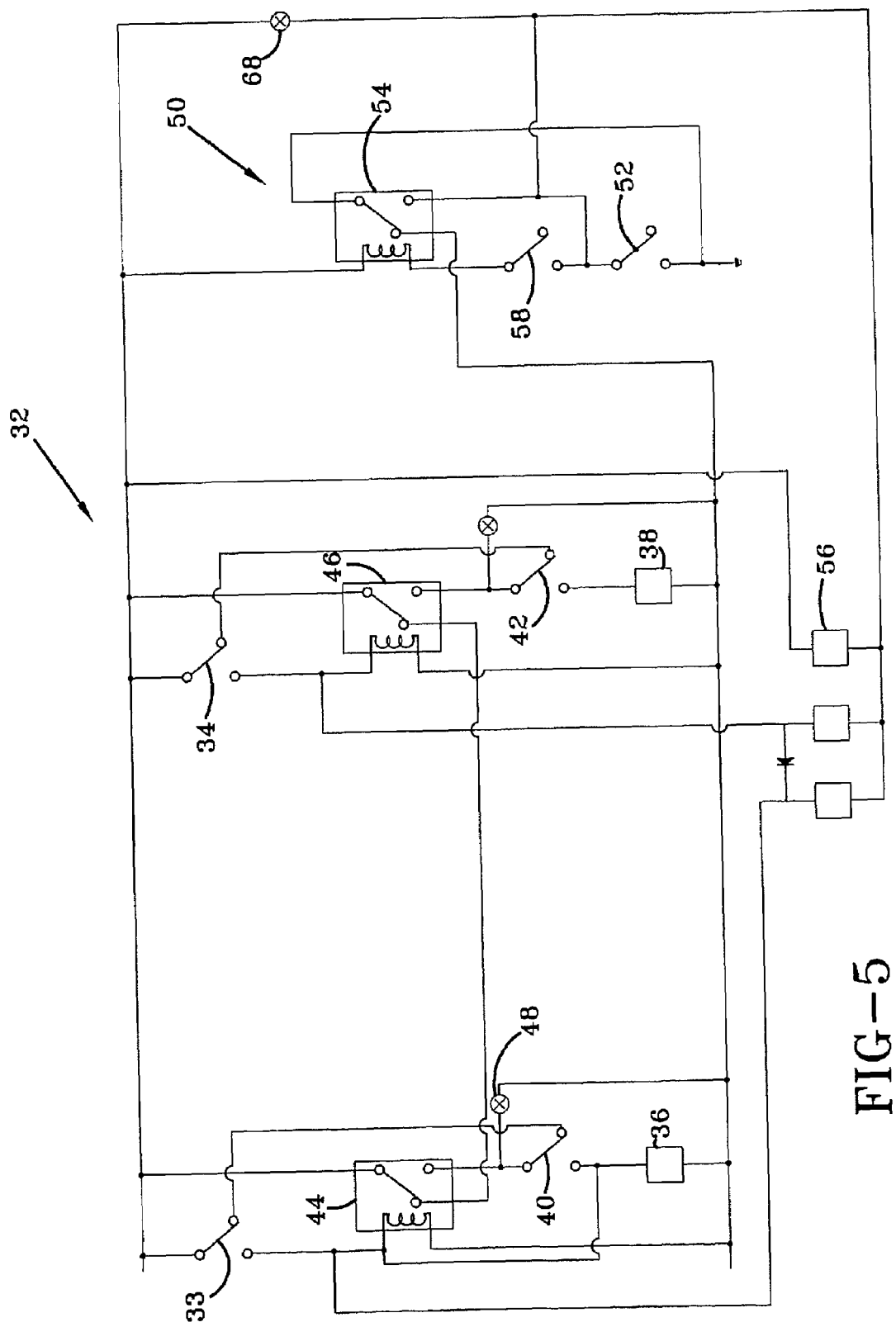
FIG. 5 is the electrical schematic of FIG. 4 with the addition of a control circuit to employ a cruise control feature.

Referring to FIG. 5, in another embodiment of the present invention an additional control circuit 50 can be added to the control circuit 30 to employ a cruise control system. The sequence described above to move the vehicle 1 in the forward or reverse direction operates in the same manner in this embodiment. The main cruise control switch 52 may be activated by an activating means 71 such as pushbuttons 76, 78 located in the steering wheel 12, or pushbuttons 158, 162 located in the dashboard 19. The activating means 71 may be located in any location chosen with sound engineering judgment. To engage the cruise control the operator closes the main cruise control switch 52 by activating the activating means 71. The main cruise control switch 52 energizes a relay 54. The relay 54 closes thus completing the circuit and allowing power to flow to a third solenoid valve 56 thereby energizing the solenoid 56. Once the solenoid 56 is energized the solenoid 56 opens and allows air to flow the vacuum actuator 20 to the vacuum means 155 thereby maintaining a vacuum in the vacuum actuator 20. The vacuum actuator 20 thereby deactivates the shift mode and activates the cruise control. At the same time a cruise control indicating light 68 is illuminated thereby letting the operator know that the vehicle 1 is in cruise control mode. The operator can deactivate the cruise control mode by pressing the brake pedal 106. A brake switch 58 is operatively connected to the brake pedal. When the operator presses the brake pedal 106 the brake switch 58 opens and interrupts the circuit. This interruption deactivates the cruise control mode and the vehicle 1 returns to the shift mode. It should be noted that the cruise control system does not have to be combined with the gear shift mechanism. It can be used alone.

Figure 7:
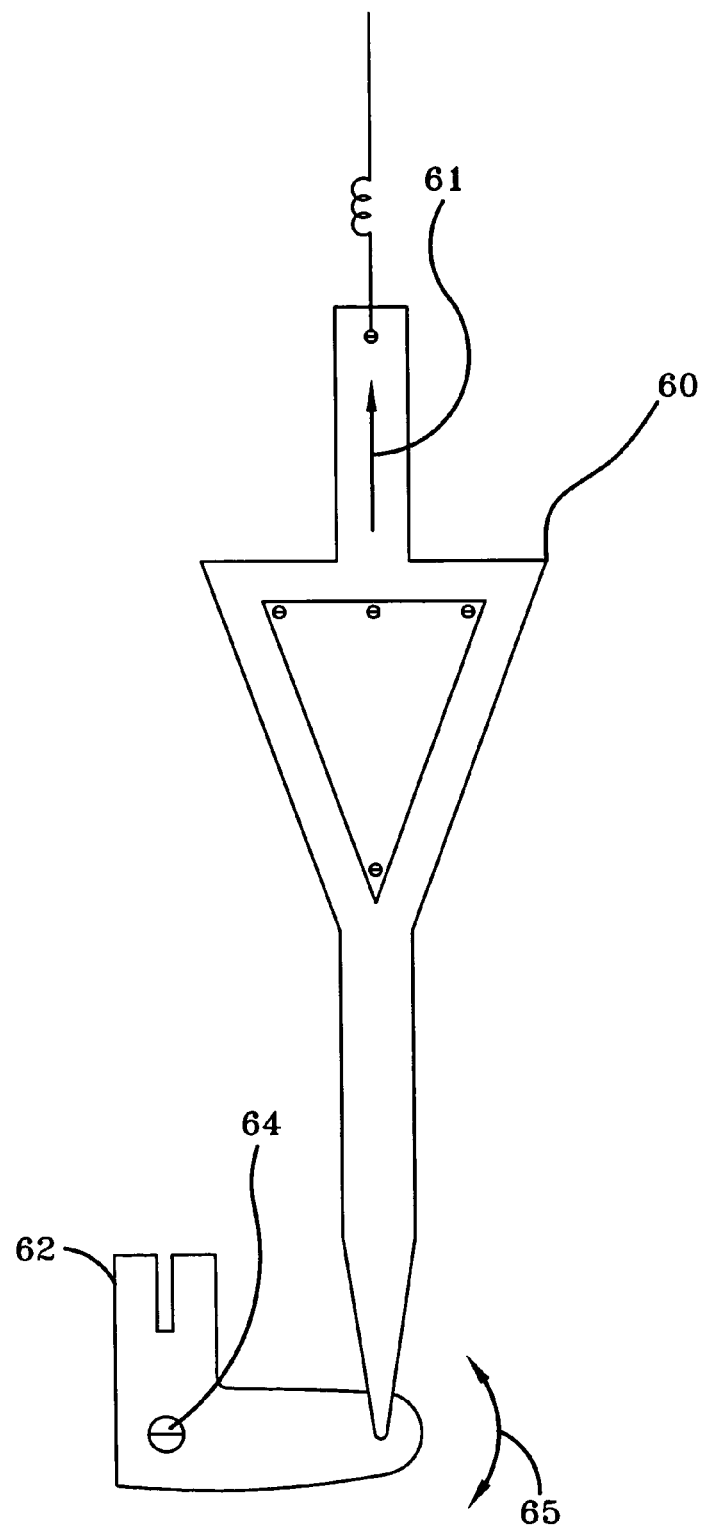
FIG. 7 is a schematic illustrating the operation of the manual control lever.

Referring to FIG. 7, the present invention also allows the operator to manually shift the transmission 22 into neutral in the event that the operator wishes to manually push the vehicle 1 to a safe location prior to starting the engine 14. When the vehicle engine 14 is off, the transmission 22 can be shifted into neutral by pulling the manual lever 60 in the direction of the arrow 61 indicated. The lever 60 is connected to a shifter 62 that rotates about a pin 64. When the operator pulls the manual lever 60 the shifter 62 rotates in the direction of the arrow 65 and disengages the transmission 22 thereby shifting the transmission 22 into neutral. This allows the operator to manually push the vehicle 1 to a safe location prior to starting the engine 14.

In another embodiment (not shown) of the present invention the vacuum actuator can be utilized to increase the speed of the vehicle 1. This is accomplished by physically displacing the idler pulley to create tension on the drive belt 86 as described in the drive system 80 above. The control system to operate this embodiment is similar to the control system for the first embodiment and will not be repeated. In addition, as with the first embodiment this embodiment can also be activated by any type of activating means such as a rocker pedal (not shown), accelerator pedal 21, control buttons 72, 74 located in the steering wheel 12, control buttons 158, 160, 162 located in the dashboard 19 or any other location chosen with sound engineering judgment. In this embodiment as the operator activates the activating means, as previously described, a vacuum begins to form in the vacuum actuator. As the vacuum forms the internal membrane, being operatively connected to the idler pulley, of the vacuum actuator moves in a direction that displaces the idler pulley such that tension begins to increase on the drive belt 86. As described above this causes the vehicle 1 to move in the forward or reverse direction. As the operator continues to activate the activating means the internal membrane will continue to move the idler pulley to further increase the tension in the drive belt 86. As the tension increases the drive belt 86 forces the disk 98 upward toward the top 100 of the variator 84. As the disk 98 moves upward the effective diameter of the lower pulley 96 decreases and the effective diameter of the upper pulley 94 increases. To compensate for the decrease in the effective diameter of the lower pulley 96 the rotational speed of the variator 84 increases. The increase in speed increases the speed in the driven belt 90, which in turn increases the speed of the input pulley 88 and subsequently increases the speed of the vehicle 1. If the operator slightly releases the activating means the reverse of the above mentioned takes place and the vehicle 1 will decrease in speed. It should be noted that the present invention can be used with other types of drive systems that may or may not employ a variator to control the speed of the vehicle 1.

While specific embodiments of the invention have been described and illustrated, it is to be understood that these embodiments are provided by way of example only and that the invention is not to be construed as being limited thereto but only by proper scope of the following claims.

We claim:

1. An off the road vehicle comprising:
a frame;
an engine operatively supported by said frame;
at least a first ground engaging drive wheel operatively supported by said frame;
a drive system for use in selectively driving said at least first ground engaging drive wheel, said drive system being operatively connected to said engine, said drive system including a transmission having a forward condition, a reverse condition and a neutral condition for driving said ground engaging wheel, said transmission having an actuator rod attached thereto for use in shifting the transmission between the forward, reverse and neutral conditions;
a transmission control system comprising:
 (1) an operator actuated activating means;
 (2) a shift control mechanism that selectively receives an input from said activating means and selectively sends a corresponding output;
 (3) a vacuum actuator operatively connected to said shift control mechanism and operatively connected to said actuating rod;
said vacuum actuator receiving said output from said shift control mechanism and adjusting said actuating rod to shift the transmission between said forward and reverse directions; and
 (4) a sensing mechanism, said sensing mechanism comprising a sensor detector and a sensor, the sensor detector being connected to said actuator rod so as to move with the actuator rod when shifting the transmission between the forward, reverse and neutral conditions, wherein the sensor detects when the sensor detector is in a neutral condition and when the sensor detector is not in the neutral condition.

2. The off the road vehicle of claim 1 wherein:
said operator actuated activating means comprises first and second devices selectively sending corresponding first and second inputs to said shift control mechanism, said shift control mechanism sending corresponding first and second outputs; and,
said actuator causing said actuating rod to move to a first position upon receipt of said first output wherein said first position of said adjustable member causes the at least first ground engaging drive wheel to rotate in a forward direction, said actuator causing said actuating rod to move to a second position upon receipt of said second output wherein said second position of said actuating rod causes the at least first ground engaging drive wheel to rotate in a reverse direction.

3. A direction control system for an off-road vehicle having a drive system that selectively drives at least one ground engaging drive wheel, the drive system including a transmission having a forward condition, a reverse condition and a neutral condition for driving said ground engaging wheel, the control system comprising:
a plurality of push buttons, said push buttons comprising at least a forward, a reverse and a neutral push button;

a vacuum actuator;

an actuator rod operatively connected to the transmission and to the vacuum actuator, where the actuator rod is movable in first and second directions by said vacuum actuator into a forward position, a reverse position, and a neutral position thereby commanding the transmission into said transmission into forward condition, the reverse condition, and the reverse condition, respectively;

a shift control mechanism that receives inputs from said plurality of push button and uses said inputs to control the vacuum actuator to selectively move the actuator rod to shift the transmission between the forward, reverse and neutral conditions based on the condition of said plurality of push buttons; and a sensing mechanism, said sensing mechanism comprising a sensor detector and a sensor, the sensor detector being connected to said actuator rod so as to move with the actuator rod when shifting the transmission between the forward, reverse and neutral conditions, wherein the sensor detects when the actuator rod is in a neutral position and when the actuator rod is not in the neutral position.

4. The direction control system of claim 3 wherein the shift control mechanism selectively activates a forward switch and a reverse switch, wherein activation of the forward switch energizes a first solenoid that causes the vacuum actuator to move the actuator rod in the first direction and activation of the reverse switch energizes a second solenoid that causes the vacuum actuator to move the actuator rod in the second direction.

5. The direction control system of claim 4 wherein the shift control mechanism comprises a microprocessor based shift module that receives inputs from said plurality of push buttons to selectively activate said forward and reverse switches.

6. The direction control system of claim 5 wherein the sensor is a ball switch that sends a neutral or not neutral signal to the shift module.

7. The direction control system of claim 6 wherein the sensor detector is triangular in shape that includes an arcuate portion at the bottom and a hub near the top, wherein a notch is centrally located within the arcuate portion that receives the ball sensor when the sensor detector is in a neutral position, and the hub receives a transmission rod operatively connected to the transmission that shifts the transmission between forward, reverse and neutral conditions.

* * * * *